US010176809B1

(12) United States Patent
Piérard

(10) Patent No.: US 10,176,809 B1
(45) Date of Patent: Jan. 8, 2019

(54) CUSTOMIZED COMPRESSION AND DECOMPRESSION OF AUDIO DATA

(71) Applicant: Amazon Technologies, Inc., Seattle, WA (US)

(72) Inventor: Adrien Hubert Marie Piérard, Pittsburg, PA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 15/280,674

(22) Filed: Sep. 29, 2016

(51) Int. Cl.
| | |
|---|---|
| *G10L 15/30* | (2013.01) |
| *H04L 12/28* | (2006.01) |
| *G10L 25/90* | (2013.01) |
| *G10L 15/18* | (2013.01) |
| *G10L 25/93* | (2013.01) |
| *G10L 19/002* | (2013.01) |

(52) U.S. Cl.
CPC .............. *G10L 15/30* (2013.01); *G10L 15/18* (2013.01); *G10L 19/002* (2013.01); *G10L 25/90* (2013.01); *G10L 25/93* (2013.01); *H04L 12/2818* (2013.01)

(58) Field of Classification Search
CPC ....... G10L 15/30; G10L 15/065; G10L 15/07; G10L 15/22; G10L 15/063; G10L 17/22; G10L 2015/088; G10L 15/06
See application file for complete search history.

(56) References Cited

U.S. PATENT DOCUMENTS

| | | | | | |
|---|---|---|---|---|---|
| 5,546,395 | A * | 8/1996 | Sharma | ................... | G10L 19/06 370/468 |
| 5,970,156 | A * | 10/1999 | Hummelgaard | ........ | G10L 25/78 381/94.2 |
| 6,345,253 | B1 * | 2/2002 | Viswanathan | .... | G06F 17/30746 704/251 |
| 6,567,778 | B1 * | 5/2003 | Chao Chang | ......... | G06F 17/271 704/257 |
| 6,879,956 | B1 * | 4/2005 | Honda | ................... | G10L 15/075 704/244 |
| 6,988,070 | B2 * | 1/2006 | Kawasaki | ............... | G10L 15/26 704/270 |
| 7,398,209 | B2 * | 7/2008 | Kennewick | ............. | G10L 15/22 704/255 |
| 9,202,458 | B2 * | 12/2015 | Braho | ..................... | G10L 15/01 |
| 9,384,754 | B2 * | 7/2016 | Des Jardins | ........ | G10L 21/0224 |
| 9,619,572 | B2 * | 4/2017 | Phillips | ............. | G06F 17/30867 |

(Continued)

*Primary Examiner* — Matthew H Baker
(74) *Attorney, Agent, or Firm* — Pierce Atwood LLP

(57) ABSTRACT

Systems and methods for compressing and decompressing audio data are described. A server may receive input audio data corresponding to a spoken utterance from a speech-controlled device. The server performs speech processing on the input audio data to determine a spoken command and spoken solicited content. The server may then communication with a device associated with an application to obtain output audio data. The server may compress the output audio data by removing portions of audio data therefrom at regular intervals (e.g., milliseconds). The server may then send the compressed output audio data and instructions for decompressing the compressed output audio data to the speech-controlled device. Further, a speech-capturing device may also compress audio data corresponding to an utterance. The speech-capturing device may compress based on various factors, including the speech characteristics of the speaking user.

18 Claims, 20 Drawing Sheets

(56) References Cited

U.S. PATENT DOCUMENTS

| | | | |
|---|---|---|---|
| 9,761,247 B2* | 9/2017 | Shriberg | G10L 25/51 |
| 9,767,820 B2* | 9/2017 | Des Jardins | G10L 21/0308 |
| 2002/0059069 A1* | 5/2002 | Hsu | G10L 15/18 |
| | | | 704/257 |
| 2002/0156622 A1* | 10/2002 | Hirsch | G10L 15/02 |
| | | | 704/220 |
| 2003/0004720 A1* | 1/2003 | Garudadri | G10L 15/30 |
| | | | 704/247 |
| 2004/0044516 A1* | 3/2004 | Kennewick | G10L 15/22 |
| | | | 704/5 |
| 2005/0027522 A1* | 2/2005 | Yamamoto | G10L 15/20 |
| | | | 704/233 |
| 2007/0294076 A1* | 12/2007 | Shore | G06F 17/2836 |
| | | | 704/2 |
| 2009/0192782 A1* | 7/2009 | Drewes | G06F 17/2818 |
| | | | 704/3 |
| 2011/0264652 A1* | 10/2011 | Roberge | G10L 15/08 |
| | | | 707/723 |
| 2012/0078397 A1* | 3/2012 | Lee | G10L 25/78 |
| | | | 700/94 |
| 2012/0150536 A1* | 6/2012 | Dognin | G10L 15/144 |
| | | | 704/231 |
| 2013/0339021 A1* | 12/2013 | Deshmukh | G10L 15/18 |
| | | | 704/257 |
| 2014/0222435 A1* | 8/2014 | Li | G01C 21/3608 |
| | | | 704/275 |
| 2014/0249810 A1* | 9/2014 | Kechichian | G10L 21/0216 |
| | | | 704/228 |
| 2014/0297252 A1* | 10/2014 | Prasad | G06F 17/289 |
| | | | 704/2 |
| 2014/0350927 A1* | 11/2014 | Yamabe | G10L 21/0232 |
| | | | 704/233 |
| 2015/0255084 A1* | 9/2015 | Oda | G10L 21/0216 |
| | | | 704/226 |
| 2016/0133256 A1* | 5/2016 | Lembersky | G10L 15/26 |
| | | | 704/235 |
| 2017/0133033 A1* | 5/2017 | Des Jardins | G10L 19/018 |

* cited by examiner

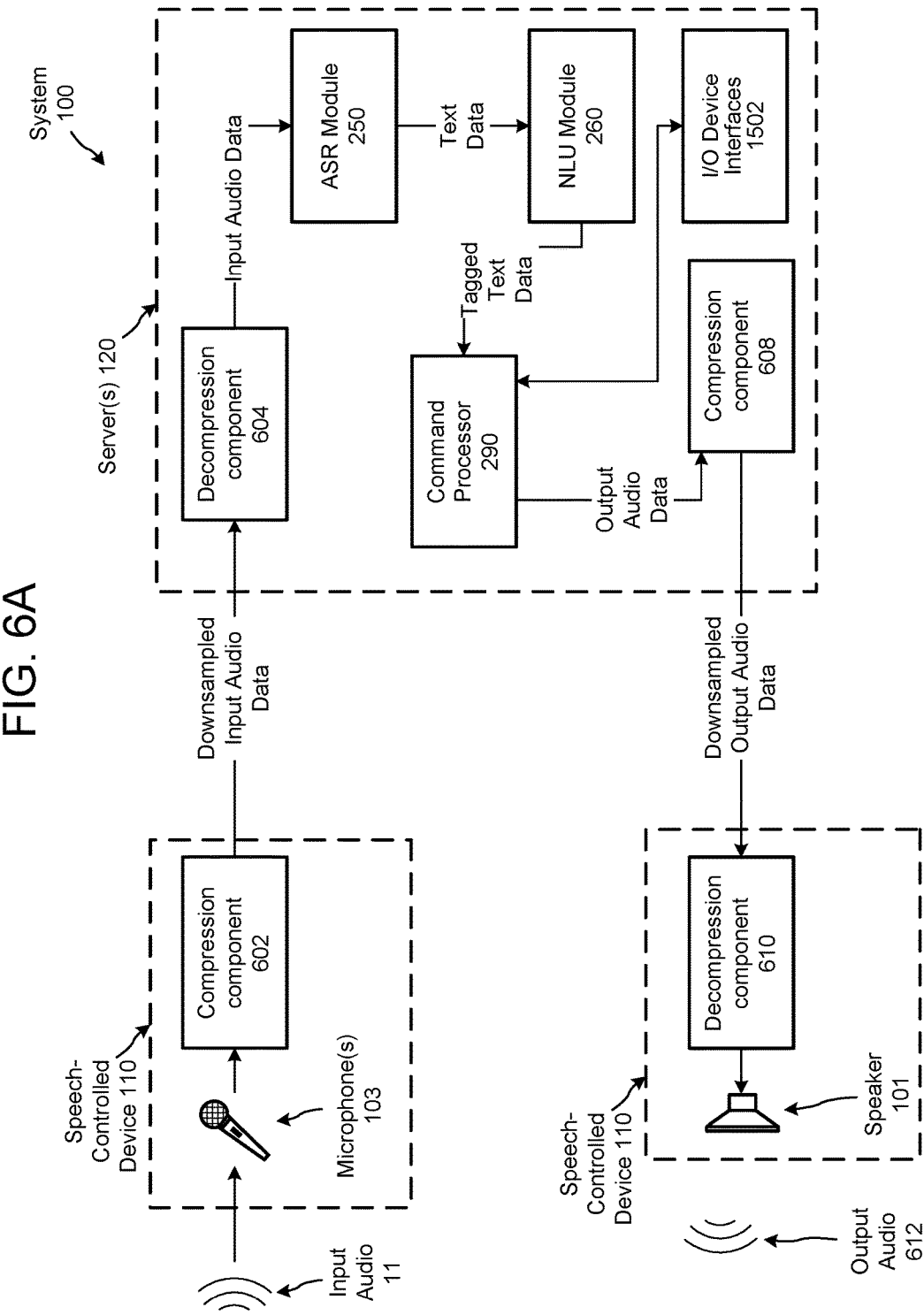

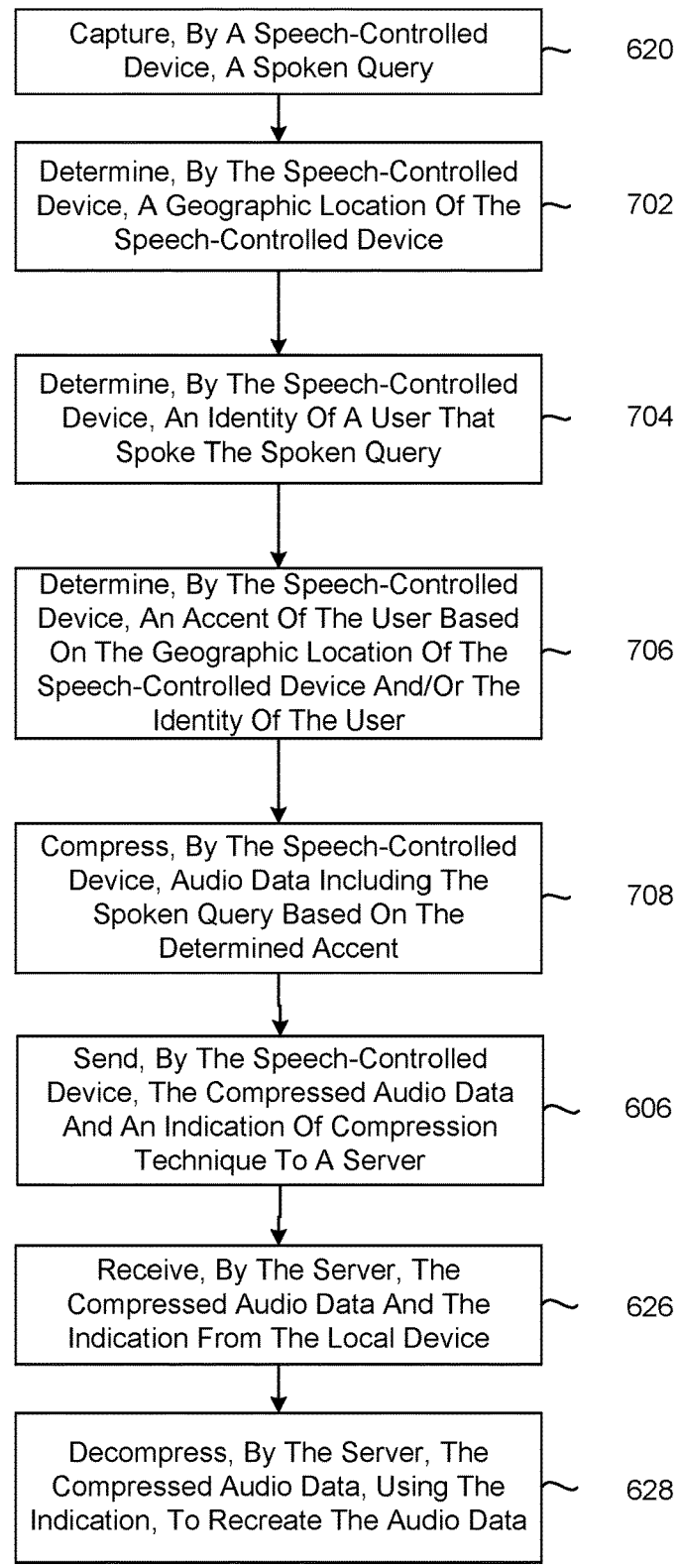

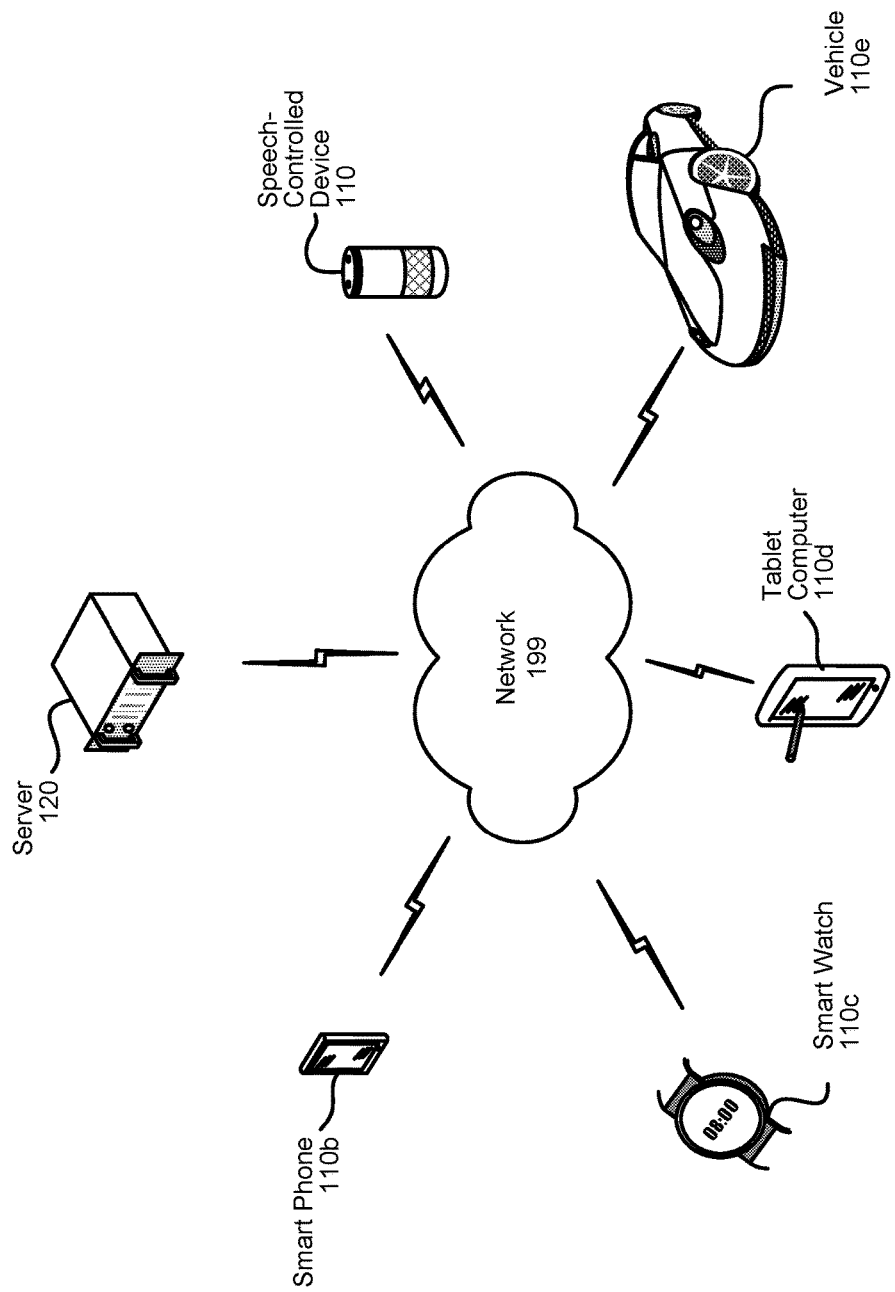

CUSTOMIZED COMPRESSION AND DECOMPRESSION OF AUDIO DATA

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6A is a system flow diagram illustrating the execution of a spoken query wherein audio data is compressed and decompressed according to embodiments of the present disclosure.

FIG. 7 is a flow diagram illustrating a method for compressing and decompressing audio data according to embodiments of the present disclosure.

FIG. 16 illustrates an example of a computer network for use with the system.

DETAILED DESCRIPTION

Figure 1:
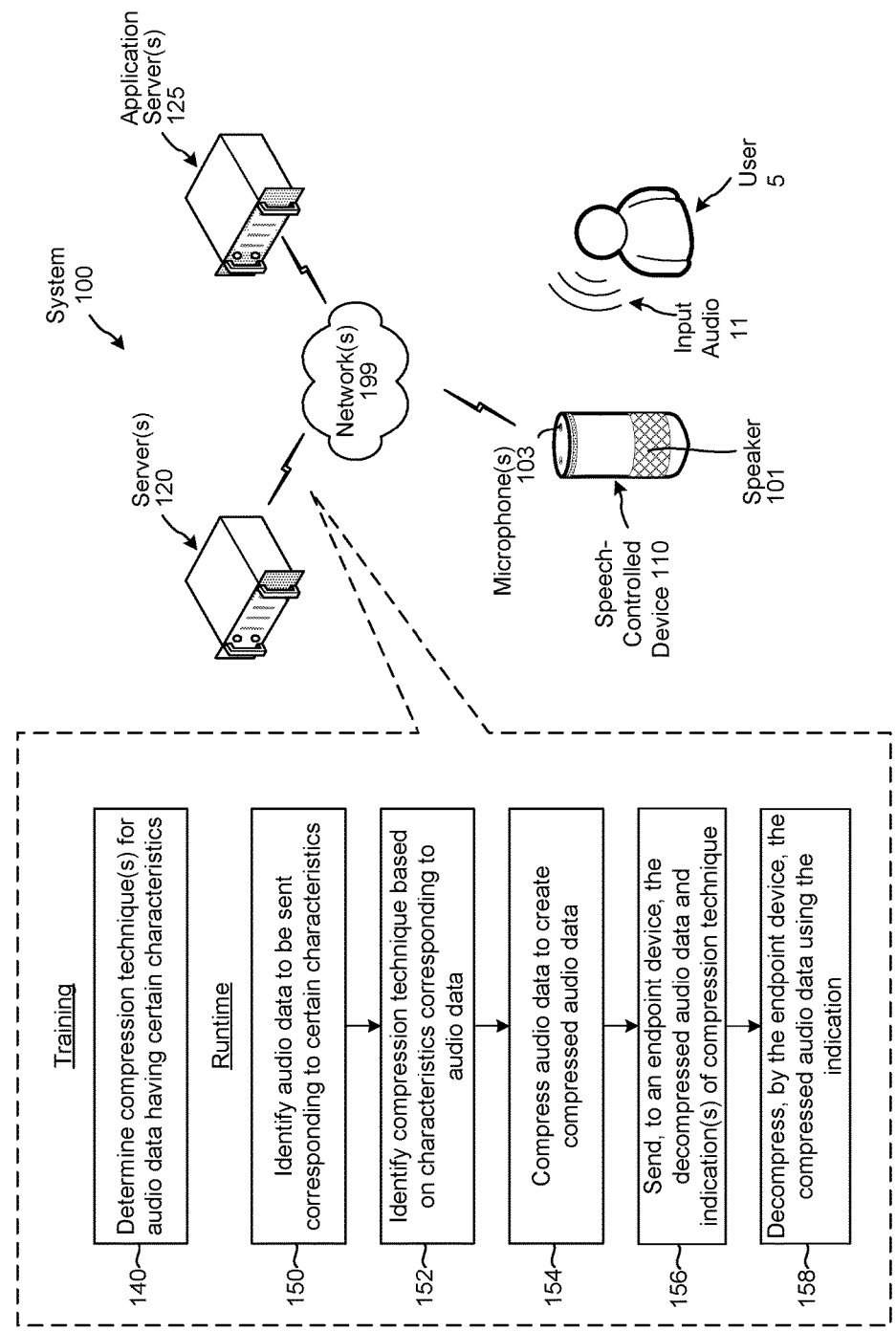
FIG. 1 illustrates a system for compressing and decompressing audio data according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Speech processing system, and other systems, transmit audio and other data between devices of the systems. As speech commands of speech processing systems become more robust, the audio data transmitted between devices of speech processing systems becomes increasingly large. Some speech processing systems may have size limits as to how much data can be transmitted at any given time. Moreover, the larger the data file sent, the longer it takes to transmit the data and the more computing resources (such as bandwidth) that are used in transmitting the data. Further, in addition to audio data corresponding to speech, output audio data that may, for example, be the result of a command initiated from the speech, may also be large.

In view of the above and other problems facing speech processing and other systems, the present disclose provides techniques for compressing audio data by a first device, transmitting the audio data from the first device to a second device, and decompressing the received audio data by the second device. Compressing audio data is a process of reducing the size (in bits) of audio data by one component in a manner that is sufficiently recoverable by another component (through decompression). The first device may use a variety of techniques to compress audio data. The system may also employ other audio processing techniques related to compressing such as anti-aliasing, etc. The particular compression and/or decompression techniques may be selected based on various characteristics of the audio being sent where a device may perform some analysis of the audio data and/or its source or other factors, and select a compression technique based on the analysis. For example, selection of a compression technique may be based on a speaker of the audio data, noise quality in the audio data (e.g., a quantity of non-speech in the audio data), a location of the first device and/or the speaker of the audio data, a device associated with an application from which the audio data was received by the first device, or other factors. A compression technique may also be selected based on the overall impact to data size v. quality for audio having the specific characteristics. A compression technique may also be selected based on a use of the compressed audio. For example, a lossy compression technique may be used if it will result in a desirable customer experience for the eventual use of the compressed audio data. In addition to sending the compressed audio data, the first device may also send an indicator or other data that indicates to the second device how the audio data was compressed, and therefrom how the audio data should be decompressed. For example, the sending device may send an indicator that the receiving device can use to look up the appropriate decompression technique to restore the audio data. Alternatively, the compression technique may be selected based on the compression technique being such that no particular decompression technique may be needed (which also may be indicated to the receiving device).

FIG. 1 shows a system 100 configured to compress and decompress audio data. Although FIG. 1, and lower figures/discussion, illustrate the operation of the system 100 in a particular order, the steps described may be performed in a different order, as well as certain steps removed or added, without departing from the intent of the disclosure. As shown in FIG. 1, the system 100 may include one or more speech-controlled devices 110 local to a user 5. The system 100 also includes one or more networks 199, one or more servers 120, and one or more application servers 125 connected to the device(s) 110 across network(s) 199. The server(s) 120, which may be one or more different physical devices, may be capable of performing traditional speech processing, such as ASR, NLU, query parsing, etc. as described herein. A single server 120 may be capable of performing all speech processing or multiple servers 120 may combine to perform the speech processing. Further, the server(s) 120 may be configured to execute certain commands, such as answering queries spoken by the user 5. In addition, certain speech detection or command execution functions may be performed by the device(s) 110.

As shown in FIG. 1, during a training phase a system (through server 120 or other component) may determine (140) one or more compression techniques that can compress audio data having certain characteristics. The specific compression technique(s) may be a combination of techniques used to reduce the size of audio data without sufficiently impacting the quality of the data that can be recreated following decompression. As explained herein, the specific compression (and corresponding decompression) technique(s) may be selected based on qualities of the audio data. The system may then store data linking qualities/features of audio data with the compression/decompression techniques that work well with audio data having those characteristics. Then, during runtime, the system may identify (150) incoming audio data to be sent and may determine that the audio data corresponds to the certain characteristics that are associated with particular compression/decompression technique(s). The server 120 may then identify (152) a compression technique based on characteristics corresponding to the audio data. The server 120 may compress (154) audio data to create compressed audio data. The server 120 may receive the audio data from an application server 125. The audio data sent to the server 120 by the application server 125 may correspond to a movie, song, video game, etc. that the server 120 does not have access to except through the application server 125. For example, the application server 125 may represent a content service that provides content data (e.g., video data, audio data, etc.) to the server 120 for passing through to the local device 110. The server 120 may compress the audio data by removing portions from the audio data using a particular compression technique as determined above based on characteristic(s) of the audio data, for example the audio data being received from the application server 125. The server 120 may also generate an indication that indicates what compression technique was used to compress the audio data and/or what decompression technique may be used to decompress and restore the audio data. The server 120 may then send (156) the compressed audio data and the indication to an endpoint device (e.g., 110) and may instruct the endpoint device regarding how the compressed audio data should be decompressed (if at all). The endpoint device (e.g., the speech-controlled device 110) compresses (158) the compressed audio data, using the indicator, to create the audio data as it existed pre-compression.

In an example, the audio data compressed by the server 120 may be received from the application server 125 in response to processing audio data corresponding to a spoken query received from the speech-controlled device 110. As such, the endpoint device may be chosen as the same device from which a spoken query was received. The speech-controlled device 110 may be represented in a user profile alone with various other devices. As such, it should be appreciated that the endpoint device may be chosen as a device different from the device from which the spoken query was received, but represented in the same user profile (described in detail herein below). An example may be a particular audio speaker where the user has indicated the output audio data should be sent (e.g. an utterance received by a device in the living room where the utterance is "play music in the kitchen.").

As also shown in FIG. 1, the speech-controlled device 110 may identify (150) audio data to be sent and identify (152) a compression technique based on characteristics corresponding to the audio data. The speech-controlled device 110 may compress (154) audio data to create compressed audio data. The speech-controlled device 110 may create the audio data by capturing spoken audio 11 and converting it into the audio data. The speech-controlled device 110 may capture the spoken audio 11 via a microphone 103 (or an array of microphones 103) located on the speech-controlled device 110. The speech-controlled device 110 may compress the audio data, using a particular compression technique depending on the audio data. For example, the compression technique may be based at least in part on a number of characteristics such as a speaker of the spoken audio 11, a noise level in the audio data, a location (e.g., a geographic location, a location within an establishment such as a house, etc.) of the speech-controlled device 110, a location (e.g., a geographic location, a location within an establishment such as a house, etc.) of the speaker of the spoken audio 11, etc. The speech-controlled device 110 may also send (156) the compressed audio data and an indicator of the compression/decompression technique(s) to an endpoint device (e.g., a server 120 associated with the speech-controlled device 110). The endpoint device (e.g., server 120) then identifies the decompression technique using the indicator and decompresses (158) the compressed audio data, using the indicator/decompression technique, to create the audio data as it existed pre-compression.

It should also be appreciated that the system 100 FIG. 1 may use a microphone array (not illustrated) located separate from the speech-controlled device 110. The microphone array may include a component (e.g., processor, module, etc.) that decompresses (154) audio data to create compressed audio data. The microphone array may create the audio data by capturing spoken audio 11 and converting it into the audio data. As with the speech-controlled device 110, the microphone array may compress the audio data by removing portions from the audio data at certain regular intervals (e.g., every nth number of milliseconds), or by removing portions from the audio data based on an identity of a speaker of the spoken audio 11, a noise level in the audio data, a location (e.g., a geographic location, a location within an establishment such as a house, etc.) of the speech-controlled device 110, a location (e.g., a geographic location, a location within an establishment such as a house, etc.) of the speaker of the spoken audio 11, etc. The microphone array may also include a component (e.g., processor, module, etc.) that sends (156) the compressed audio data and an indicator of compression/decompression technique(s) to an endpoint device (e.g., a server 120 associated with the microphone array) either directly or indirectly via a companion application of a mobile computing device (not illustrated), such as a smart phone, tablet, laptop, etc. The indicator of compression/decompression technique(s) may be generated by a component (e.g., processor, module, etc.) of the microphone array and may instruct the endpoint device regarding how the compressed audio data should be decompressed. The endpoint device (e.g., server 120) compresses (158) the compressed audio data, using the indicator of compression/decompression technique(s), to create the audio data as it existed pre-compression.

Figure 2:
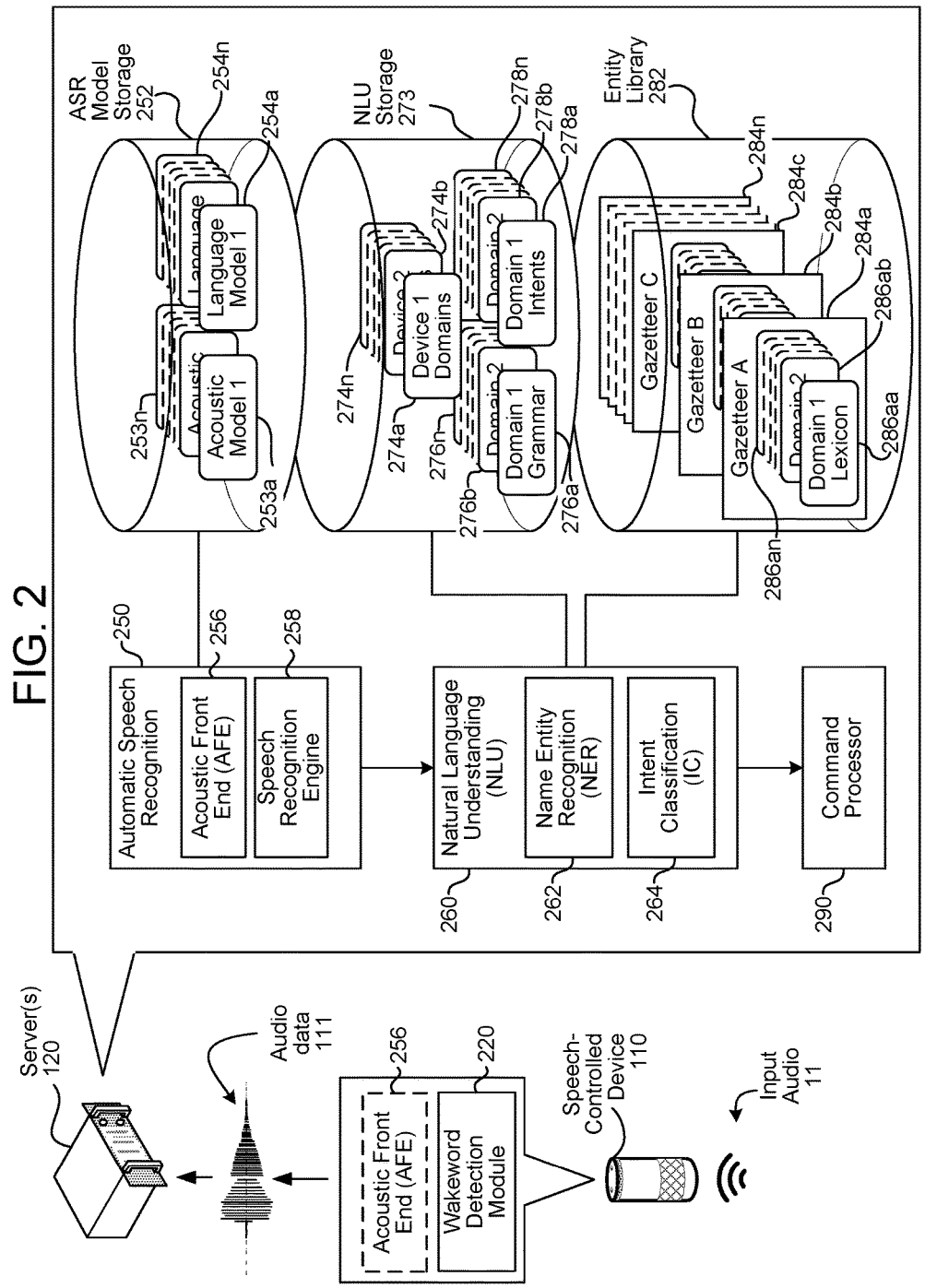
FIG. 2 is a conceptual diagram of how a spoken utterance may be processed according to embodiments of the present disclosure.

Further details of generating compression and decompressing audio data are explained below, following a discussion of the overall speech processing system of FIG. 2. The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as a microphone 103 of a speech-controlled device 110 (or other device), captures audio 11 corresponding to a spoken utterance. The device sends audio data 111 corresponding to the utterance, to an ASR module 250. The audio data 111 may be output from an acoustic front end (AFE) 256 located on the device 110 prior to transmission. Alternatively, the audio data 111 may be output in a form for processing by a remote AFE 256, such as the AFE 256 located with the ASR module 250.

The ASR module 250 converts the audio data 111 into text. The ASR module 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the utterance based on a similarity between the utterance and pre-established language models 254 stored in an ASR model knowledge base (i.e., ASR model storage 252). For example, the ASR module 250 may compare the audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, a similarity of the sound in the utterance to models for language sounds (e.g., an acoustic model 253 stored in the ASR model storage 252), and a likelihood that a particular word that matches the sounds would be included in the sentence at the specific location (e.g., using a language model 254 stored in the ASR model storage 252). Thus each potential textual interpretation of the spoken utterance (i.e., hypothesis) is associated with a confidence score. Based on the considered factors and the assigned confidence score, the ASR module 250 outputs the most likely text recognized in the audio data 111. The ASR module 250 may also output multiple hypotheses in the form of a lattice or an N-best list with each hypothesis corresponding to a confidence score or other score (e.g., such as probability scores, etc.).

The device or devices performing the ASR module 250 may include an AFE 256 and a speech recognition engine 258. The AFE 256 transforms the audio data 111, captured by the microphone 103, into data for processing by the speech recognition engine 158. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known skilled in the art.

The speech recognition engine 258 may process data output from the AFE 256 with reference to information stored in the ASR model storage 252. Alternatively, post front-end processed data (e.g., feature vectors) may be received by the device executing ASR processing from another source besides the internal AFE 256. For example, the device 110 may process audio data 111 into feature vectors (e.g., using an on-device AFE 256) and transmit that information to a server 120 across a network 199 for ASR processing. Feature vectors may arrive at the server 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 250 will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text into commands for execution, either by the device 110, by the server 120, or by another device (e.g., a server running a search engine, etc.)

The device performing NLU processing (e.g., the server 120) may include various components, including potentially dedicated processor(s), memory, storage, etc. The device performing NLU processing may include a dedicated NLU module/component 260, which may include a named entity recognition (NER) module 262, and intent classification (IC) module 264. The device performing NLU processing may additionally include NLU storage 273, and a knowledge base (not illustrated). The knowledge base is a database or other information storage that may include information about entities that may be used in resolving user queries. The NLU module 260 may also utilize gazetteer information 284a-284n stored in an entity library storage 282. The knowledge base and/or gazetteer information 284a-284n may be used for entity resolution, for example matching ASR results with different entities (e.g., song titles, contact names, etc.). Gazetteers 284a-284n may be linked to users (e.g., a particular gazetteer may be associated with a specific user's music collection), may be linked to certain domains (e.g., shopping), or may be organized in a variety of other ways.

The NLU module 260 takes textual input (e.g., output from the ASR module 250 based on the utterance 11) and attempts to make a semantic interpretation of the text. That is, the NLU module 260 determines the meaning behind the text based on the individual words and then implements that meaning. The NLU module 260 interprets a text string to derive an intent or a desired action from the user as well as the pertinent pieces of information in the text that allow a device (e.g., the device 110, the server 120, etc.) to complete that action. For example, if a spoken utterance is processed using the ASR module 250, which outputs the text "call mom", the NLU module 260 may determine the user intended to activate a telephone in his/her device and to initiate a call with a contact matching the entity "mom."

The NLU module 260 may process several textual inputs related to the same utterance. For example, if the ASR module 250 outputs N text segments (e.g., as part of an N-best list), the NLU module 260 may process all N outputs to obtain NLU results.

As will be discussed further below, the NLU module 260 may be configured to parse and tag to annotate text as part of NLU processing. For example, for the text "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU module 260 may be configured to determine a "domain" of the utterance so as to determine and narrow down which services offered by an endpoint device (e.g., the server 120 or the device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The NER module 262 receives a query in the form of ASR results and attempts to identify relevant grammars and lexical information that may be used to construe meaning. To do so, the NER module 262 may begin by identifying potential domains that may relate to the received query. The NLU storage 273 includes a database of domains 274a-274n associated with specific devices. For example, the device 110 may be associated with domains for music, telephony, calendaring, contact lists, and device-specific communications, but not video. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276a-276n, a particular set of intents/actions 278a-278n, and/or a particular personalized lexicon 286. Each gazetteer 284a-284n may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query may be processed applying the rules, models, and information applicable to each identified domain. For example, if a query potentially implicates both communications and music, the query will be NLU processed using the grammar models and lexical information for communications, and will also be processed using the grammar models and lexical information for music. The responses to the query produced by each set of models is scored (as discussed further below), with the overall highest ranked result from all applied domains being ordinarily selected to be the correct result.

An IC module 264 parses the query to determine an intent(s) for each identified domain, where the intent(s) corresponds to the action to be performed that is responsive to the query. Each domain is associated with a database 278a-278n of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER module 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model 276 associated with a shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar 276 framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or the NER module 262 may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (i.e., in the NLU storage 273). For instance, if the query was "play songs by the rolling stones," after failing to determine an album name or song name called "songs" by "the rolling stones," the NER module 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the voice-controlled device "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the query. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text, commands, etc., may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may be a music playing application, such as one located on the device 110 or in a music playing appliance, configured to execute a music playing command. If the NLU output includes a search query (e.g., requesting the return of search results), the command processor 290 selected may include a search engine processor, such as one located on a search server, configured to execute a search command and determine search results, which may include output text to be processed by a TTS engine and output from a device as synthesized speech.

Figure 3:
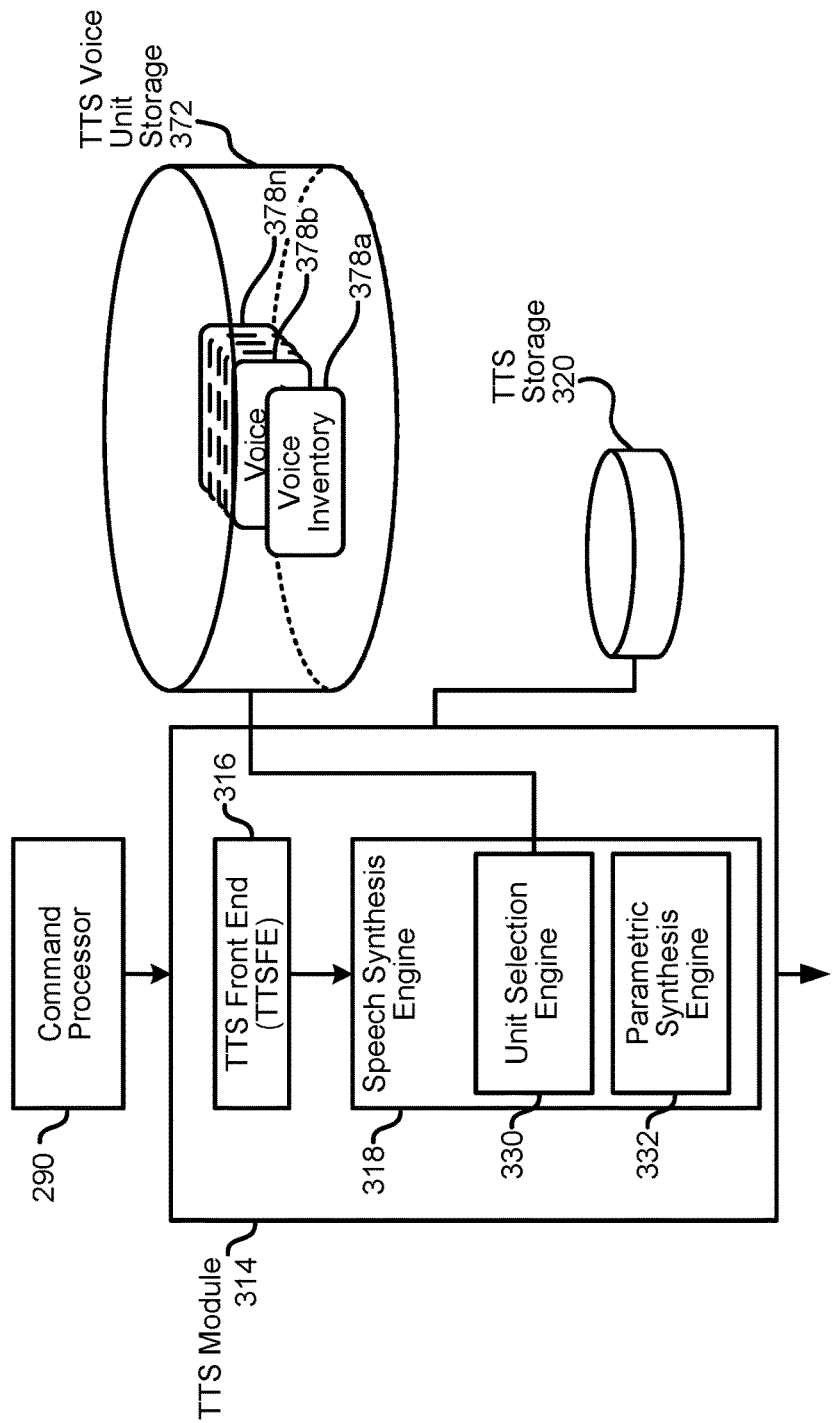
FIG. 3 is a conceptual diagram of how text-to-speech processing is performed according to embodiments of the present disclosure.

A TTS module 314 may receive tagged text data from the command processor 290, so the TTS module 314 may synthesize speech corresponding to the text data. Speech may be synthesized by the TTS module 314 as described below with respect to FIG. 3.

The TTS module/processor/component 314 includes a TTS front end (TTSFE) 316, a speech synthesis engine 318, and a TTS storage 320. The TTSFE 316 transforms input text data (e.g., from the command processor 290) into a symbolic linguistic representation for processing by the speech synthesis engine 318. The TTSFE 316 may also process tags or other data input to the TTS module 314 that indicate how specific words should be pronounced. The speech synthesis engine 318 compares the annotated phonetic units and information stored in the TTS storage 320 for converting the input text data into speech (i.e., audio data). The TTSFE 316 and the speech synthesis engine 318 may include their own controller(s)/processor(s) and memory, or they may use the controller/processor and memory of the server 120, the device 110, or another device, for example. Similarly, the instructions for operating the TTSFE 316 and the speech synthesis engine 318 may be located within the TTS module 314, within the memory and/or storage of the server 120, the device 110, or within an external device.

Text data input into the TTS module 314 may be sent to the TTSFE 316 for processing. The TTSFE 316 may include modules for performing text normalization, linguistic analysis, and linguistic prosody generation. During text normalization, the TTSFE 316 processes the input text data and generates standard/normalized text data, converting such things as numbers, abbreviations (e.g., Apt., St., etc.), and symbols ($, %, etc.) into the equivalent of written out words.

During linguistic analysis the TTSFE 316 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS module 314 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS module 314 to craft a natural sounding audio waveform output. The language dictionary may also include letter-to-sound rules and other tools that may be used to pronounce previously unidentified words or letter combinations that may be encountered by the TTS module 314. Generally, the more information included in the language dictionary, the higher quality the speech output.

Based on the linguistic analysis, the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text data input to the TTS module 314. Such acoustic features may include pitch, energy, duration, and the like. Application of acoustic features may be based on prosodic models available to the TTS module 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to the speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 330 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 332, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS module 314 may include an acoustic model, or other models, which may convert a symbolic linguistic representation into a synthetic acoustic waveform of the input text data based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (e.g., phoneme identity, stress, accent, position, etc.). An initial determination of a probability of a potential phoneme may be associated with one state. As new text is processed by the speech synthesis engine 318, the state may change or stay the same, based on processing of the new text. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 378a-378n (stored in TTS voice unit storage 372), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match a desired speech quality. The customized voice inventory 378 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS module 314 may synthesize speech as normal, but the system 100, either as part of the TTS module 314 or otherwise, may apply a filter to make the synthesized speech take on the desired speech quality. In this manner a traditional TTS output may be altered to take on the desired speech quality.

During runtime the TTS module 314 may receive text data for speech synthesis along with an indicator for a desired speech quality of the output speech. The TTS module 314 may then select a voice matching the speech quality, either for unit selection or parametric synthesis, and synthesize speech using the received text data and speech quality indicator.

Figure 4:
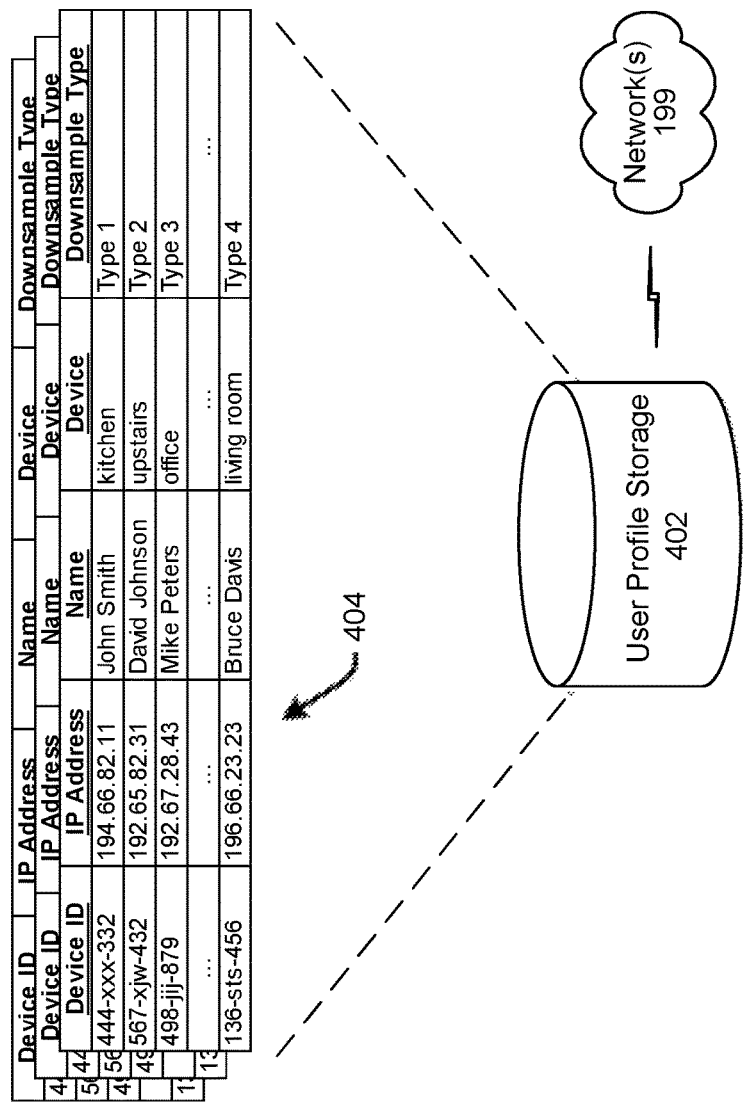
FIG. 4 illustrates data stored and associated with user profiles according to embodiments of the present disclosure.

FIG. 4 illustrates a user profile storage 402 that includes data regarding user accounts 404 as described herein. The user profile storage 402 may be located proximate to the server 120, or may otherwise be in communication with various components, for example over the network 199. The user profile storage 402 may include a variety of information related to individual users, accounts, etc. that interact with the system 100. For illustration, as shown in FIG. 4, the user profile storage 402 may include data regarding the devices associated with particular individual user accounts 404. In an example, the user profile storage 402 is a cloud-based storage. Each user profile 404 may include data such as device identifier (ID) data, internet protocol (IP) address data, name of device data, location of device data, and compressing data specific to different devices and users. The user profile storage 402 may also include information about what compression/decompression technique(s) should be used with audio data having certain characteristics, for example techniques determined as explained below in reference to FIG. 5.

Figure 5:
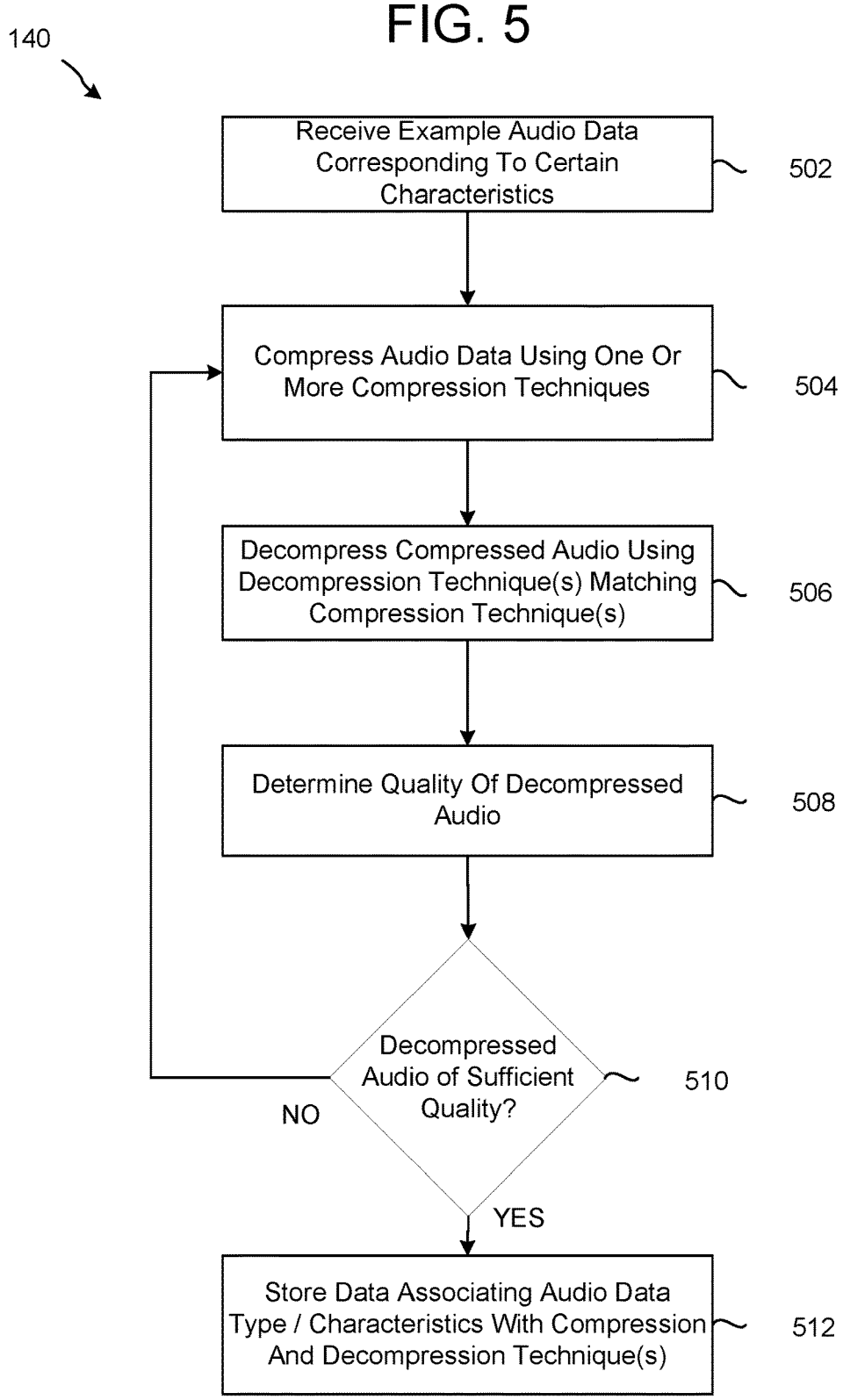
FIG. 5 is a flow diagram illustrating a method for training a system to select a compression technique based on audio data to be transmitted.

FIG. 5 illustrates determining (140), during a testing/model building phase, one or more compression technique(s) to compress audio data having certain characteristics. As illustrated, the system may receive (502) example audio data corresponding to certain characteristics. The example audio data may include a plurality of audio samples having certain characteristics. The characteristics may be varied depending on how the system is configured to differentiate audio data. For example, the audio data may correspond to a particular speaker, to a voice having a particular accent, to audio data with a certain noise level or coming from a certain environment, to audio data coming from a particular source (such as a particular application server 125), to audio data corresponding to a particular actor or character voice, to audio data originating from a particular geographic location, to audio data originating from a particular device, and many other characteristics. The particular audio data may correspond to a particular sample of audio data (such as an example of a user speaking) or to a portion of a particular sample. That is, the system may be configured to determine where one compression/decompression technique may be appropriate for a first portion of audio data (such as the first half of an audio clip) but may also determine that a different compression/decompression technique may be appropriate for a second portion of audio data (such as the second half of an audio clip). The system may then ultimately use one compression technique for the first half and the different technique for the second half, and the indication of the technique may include time stamps as to when the first compression technique is used (and thus when a first decompression technique corresponding to the first compression technique should be used) and when the second compression technique is used (and thus when a second decompression technique corresponding to the second compression technique should be used). Thus audio data as used herein may correspond to entire audio data segments or portion(s) thereof.

The system may compress (504) audio data using one or more compression techniques and then may decompress (506) the decompressed audio using one or more decompression techniques corresponding to the one or more compression techniques used in step 504. In this manner the system may simulate the runtime environment in which the compression/decompression technique(s) may be used. The system may then determine (508) the quality of the decompressed audio determined in step 506. If the quality of the resulting decompressed audio is not of sufficient quality (510:No), the system may continue steps 504-508 to determine which compression/decompression technique(s) give sufficient quality results for audio data having the particular characteristic(s). If the quality of the resulting decompressed audio is of sufficient quality (510:Yes), the system may store (512) data associating the audio data type and/or characteristic(s) with the compression/decompression technique(s) that gave the sufficient quality results. This stored data may include data such as a lookup table indication what compression/decompression technique(s) should be used with audio data having what characteristic(s). The stored data may also include a machine learning trained model used to determine dynamically at runtime what compression/decompression technique(s) should be used with what audio data. Other stored data may also be used. The stored data may be used to select compression technique(s) at runtime and may also be used to select decompression technique(s) (for example using the indicator) that match the runtime compression technique(s) (and thus may be used to create decompressed data).

Machine learning techniques may be used to train a model to select the compression technique at runtime, to determine whether decompressed audio is not of sufficient quality (510 or other steps described herein. Example machine learning techniques include, for example neural networks, inference engines, trained classifiers, etc. Examples of trained classifiers include support vector machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers (either binary or multiple category classifiers) may issue a "score" indicating which category the data most closely matches. The score may provide an indicator of how closely the data matches the category. For example, in the present application, a support vector machine (SVM) may be trained/configured to process audio data, for example audio feature vectors, to determine if speech associated with the audio feature vectors was shouted/emphasized.

Training a machine learning component requires establishing a "ground truth" for the training examples. In machine learning, the term "ground truth" refers to the accuracy of a training set's classification for supervised learning techniques. Various techniques may be used to train models for use herein.

Further, many different compression/decompression technique(s) may be used herein, and techniques may even be combined for audio data having certain characteristics. Such techniques may include lossy or lossless techniques, MP3, Lempel-Ziv (LZ) compression, Microsoft's Windows Media lossless compression, Free Lossless Audio Codec (FLAC), Apple's Apple Lossless (ALAC), downsampling techniques, and others.

FIG. 6A illustrates the execution of a spoken query by the system 100 wherein audio data is compressed and decompressed. A microphone 103 of the speech-controlled device 110 captures spoken audio 11. Although the query may be any type of query, for illustration purposes the example spoken audio 11 may correspond to a spoken query requesting the national anthem be played. For example, the spoken audio 11 may state "Play the National Anthem." The speech-controlled device 110 may convert the captured spoken audio 11 into input audio data, and a decompression component 602 of the speech-controlled device 110 may compress the input audio data to create compressed input audio data. The speech-controlled device 110 may then send the compressed input audio data and an associated indicator corresponding to a compression technique used by the decompression component 602, such as an indicator of compression/decompression technique(s) (not illustrated), to the server 120 for processing.

A compression component 604 of the server 120 may decompress the compressed input audio data 604, using the indicator of compression/decompression technique(s), to recreate the original input audio data (or a sufficient facsimile thereof). The recreated input audio data may be communicated from the decompression component 604 to an ASR module 250 of the server 120. The ASR module 250 converts the received input audio data into text data. According to the above example, the ASR module 250 would create text data stating "Play the National Anthem." The text data may then be communicated from the ASR module 250 to a NLU module 260 of the server 120. The NLU module 260 performs natural language understanding processing on the received text data, and tags portions of the text data. According to the above example, the NLU module 260 may create the a [Play] tag that indicates a command of the spoken query, a [Song] tag that indicates a content type of the spoken query, and a [U.S. National Anthem] tag that indicates particularized content sought in the spoken query. The tags and associated text data may be communicated from the NLU module 260 to a command processor 290 (which may be part of the server 120 or may be associated with another device, such as application server 125). The command processor 290 executes one or more commands with respect to the tags and associated text data. In an example, the server 120 may not store the audio data indicated by the tag sought content (e.g., the National Anthem). In this example, the command processor 290, or another component of the server 120, may interact with a device outside of the server 120 (e.g., the application server 125) via I/O device interfaces 1502 to obtain the sought audio content. When the server 120 receives the solicited audio content (e.g., National Anthem audio data), the command processor 290 may communicate output audio data (e.g., the National Anthem audio data) to a decompression component 608 of the server 120. (Although illustrated as coming from the command processor 290, the output audio data may come from any number of components, such as a TTS module 314.) The decompression component 608 may compress the output audio data to create compressed output audio data. The server 120 may send the compressed output audio data, along with an indicator corresponding to a compressing technique used by the decompression component 608, such as an indicator of compression/decompression technique(s) and a signal indicating the output audio data should be output, to the speech-controlled device 110. While it is described that the compressed output audio data is sent to the speech-controlled device 110 from which the original spoken query audio data originated, it should be appreciated that the compressed output audio data may be sent to a different device indicated in a user profile that also indicates the speech-controlled device 110, such as a television, audio speaker or the like.

A compression component 610 of the speech-controlled device 110 compresses the compressed output audio data, using the indicator of compression/decompression technique(s), to create the output audio data (or a sufficient facsimile thereof). The speech-controlled device 110 then outputs, according to the received signal, audio 612 corresponding to the recreated output audio data via a speaker 101. The speaker 101 can be integrated in the speech-controlled device 110 (as illustrated), or the speaker 101 may be separate from but in communication with the speech-controlled device 110.

It has been described, with respect to FIG. 6A, that compressed audio data is sent both from the speech-controlled device 110 to the server 120 and from the server 120 to the speech-controlled device 110. Yet, it should be appreciated that compressed audio data may be sent from the speech-controlled device 110 to the server 120, but that traditional, non-compressed audio data may be sent from the server 120 to the speech-controlled device 110, and vice versa.

Figure 6B:
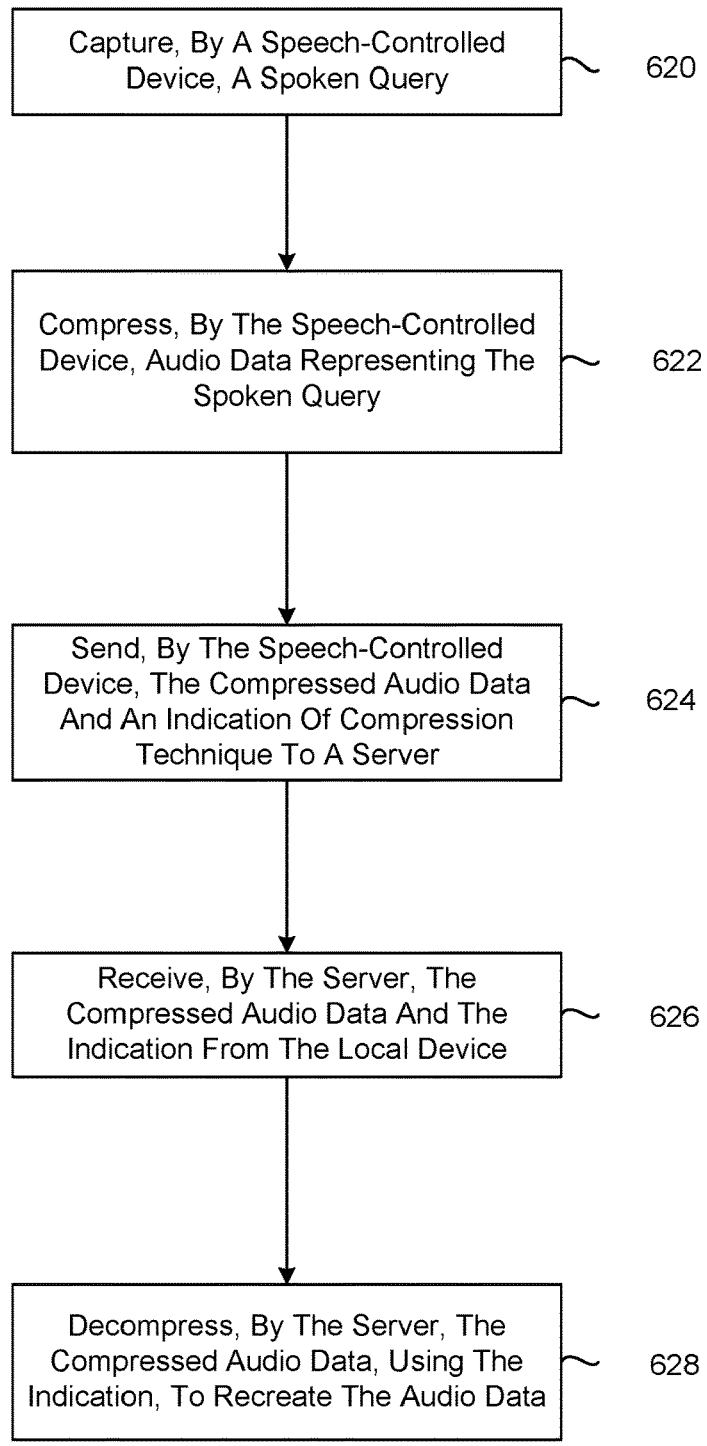
FIG. 6B is a flow diagram illustrating a method for compressing and decompressing audio data according to embodiments of the present disclosure.

One way of compressing audio data is to remove portions of the audio data at given intervals, as illustrated in FIG. 6B.

For example, a speech-controlled device 110 may capture (620) spoken audio corresponding to a spoken query. The speech-controlled device 110 may convert the spoken audio into audio data, and compress (622) the audio data by removing every other nth quality (e.g., every other 5 milliseconds) of the audio data. The speech-controlled device 110 may then send (624) the compressed audio data and an indicator of compression/decompression technique(s) to a server 120 associated with the speech-controlled device 110. The server 120 receives (626) the compressed audio data and the indicator of compression/decompression technique(s) from the speech-controlled device 110, and compresses (628) the compressed audio data, using the indicator of compression/decompression technique(s), to recreate the audio data.

Another way of compressing audio data is to remove portions of the audio data based on a geographic location of a device and/or an identity of a user of the device, as illustrated in FIG. 7. The speech-controlled device 110 may capture (620) spoken audio corresponding to a spoken query. The speech-controlled device 110 may convert the spoken audio into audio data (not illustrated). The speech-controlled device 110 may also determine (702) a geographic location of the speech-controlled device 110. The geographic location of the speech-controlled device 110 may be determined based on output of a Global Positioning System (GPS) of the speech-controlled device 110. The speech-controlled device 110 may also determine (704) an identity of a user that spoke the spoken query. The identity of the user may be determined using a speaker identification technique. For example, a user's speech may be associated with certain characteristics. As such, the speech-controlled device 110 can analyze the audio data corresponding to the spoken query to determine unique characteristics located therein, and then compare the determined unique characteristics to stored unique speech characteristics (e.g., stored in a user profile associated with the speech-controlled device 110) to determine a speaker ID associated with the user. The speech-controlled device 110 may then determine (706) an accent of the user based on the geographic location of the speech-controlled device 110 and/or the identity of the user. This is because users located at different geographic locations (e.g., continents, regions within a continent, etc.) speak with different accents. The speech-controlled device 110 may then compress (i.e., remove portions from the audio data to create a smaller audio data file) (708) the audio data based on the determined accent. The speech-controlled device 110 may then send (624) the compressed audio data and an indicator of compression/decompression technique(s) to the server 120. The server 120 receives (626) the compressed audio data and the indicator of compression/decompression technique(s) from the speech-controlled device 110, and compresses (628) the compressed audio data, using the indicator of compression/decompression technique(s), to recreate the audio data.

Figure 8:
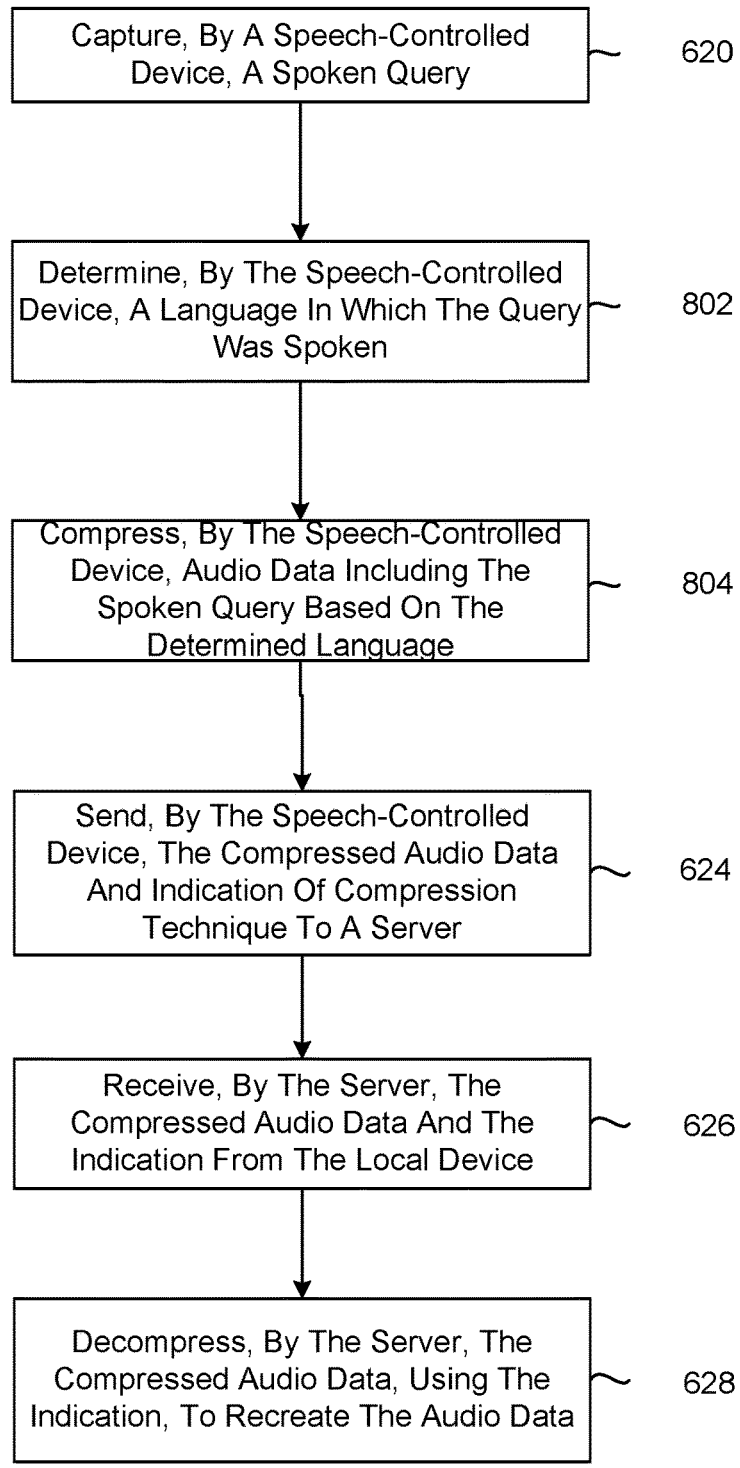
FIG. 8 is a flow diagram illustrating a method for compressing and decompressing audio data according to embodiments of the present disclosure.

A further way to compress audio data is to remove portions of the audio data based on a language in which a query is spoken, as illustrated in FIG. 8. The speech-controlled device 110 may capture (620) spoken audio corresponding to a spoken query. The speech-controlled device 110 may convert the spoken audio into audio data (not illustrated). The speech-controlled device 110 may determine (802) a language in which the query was spoken. Determining the language may include the speech-controlled device 110 accessing a user profile, associated with the speech-controlled device 110, to determine what language users of the speech-controlled device 110 speak. Determining the language may also include the speech-controlled device 110 determining a geographic location (e.g., content, country, state, etc.) of the speech-controlled device 110. The geographic location of the speech-controlled device 110 may be determined based on output of a Global Positioning System (GPS) of the speech-controlled device 110. Determining the language may additionally include the speech-controlled device 110 performing processing on the audio data as known in the art. The speech-controlled device 110 may compress (i.e., remove portions from the audio data to create a smaller audio data file) (804) the audio data based on the determined language. The speech-controlled device 110 may then send (624) the compressed audio data and an indicator of compression/decompression technique(s) to the server 120. The server 120 receives (626) the compressed audio data and the indicator of compression/decompression technique(s) from the speech-controlled device 110, and compresses (628) the compressed audio data, using the indicator of compression/decompression technique(s), to recreate the audio data.

Figure 9:
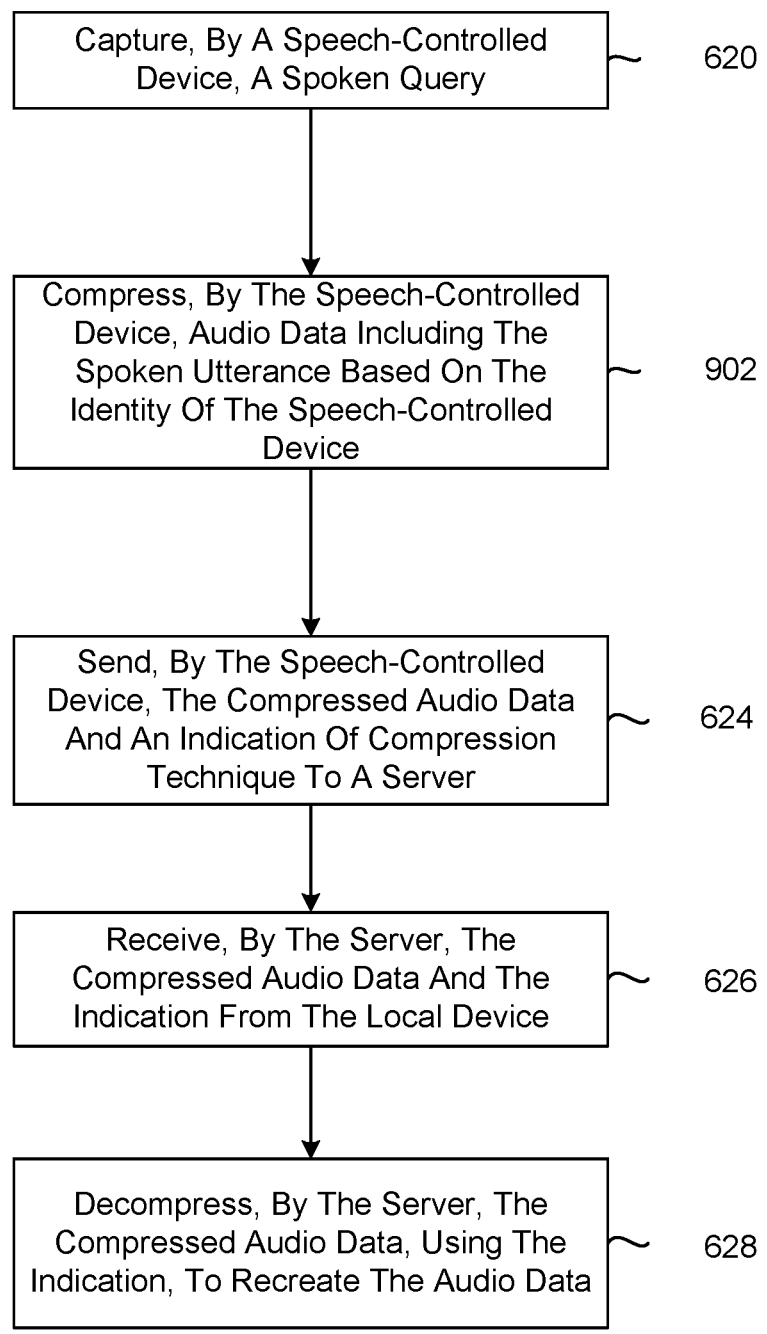
FIG. 9 is a flow diagram illustrating a method for compressing and decompressing audio data according to embodiments of the present disclosure.

An additional way to compress audio data is to remove portions of the audio data based on an identity of the device that captures the spoken query, as illustrated in FIG. 9. The speech-controlled device 110 may capture (620) spoken audio corresponding to a spoken query. The speech-controlled device 110 may convert the spoken audio into audio data (not illustrated). The speech-controlled device 110 may then compress (i.e., remove portions from the audio data to create a smaller audio data file) (902) the audio data based on the speech-controlled device 110 being a speech-controlled device. For example, the system 100 of the present disclosure may include various types of user devices. Users may speak to each type of user device differently, due to different devices having different structures that spoken queries need to conform to, etc. The speech-controlled device 110 may then send (624) the compressed audio data and an indicator of compression/decompression technique(s) to the server 120. The server 120 receives (626) the compressed audio data and the indicator of compression/decompression technique(s) from the speech-controlled device 110, and decompress (628) the compressed audio data, using the indicator of compression/decompression technique(s), to recreate the audio data.

Figure 10:
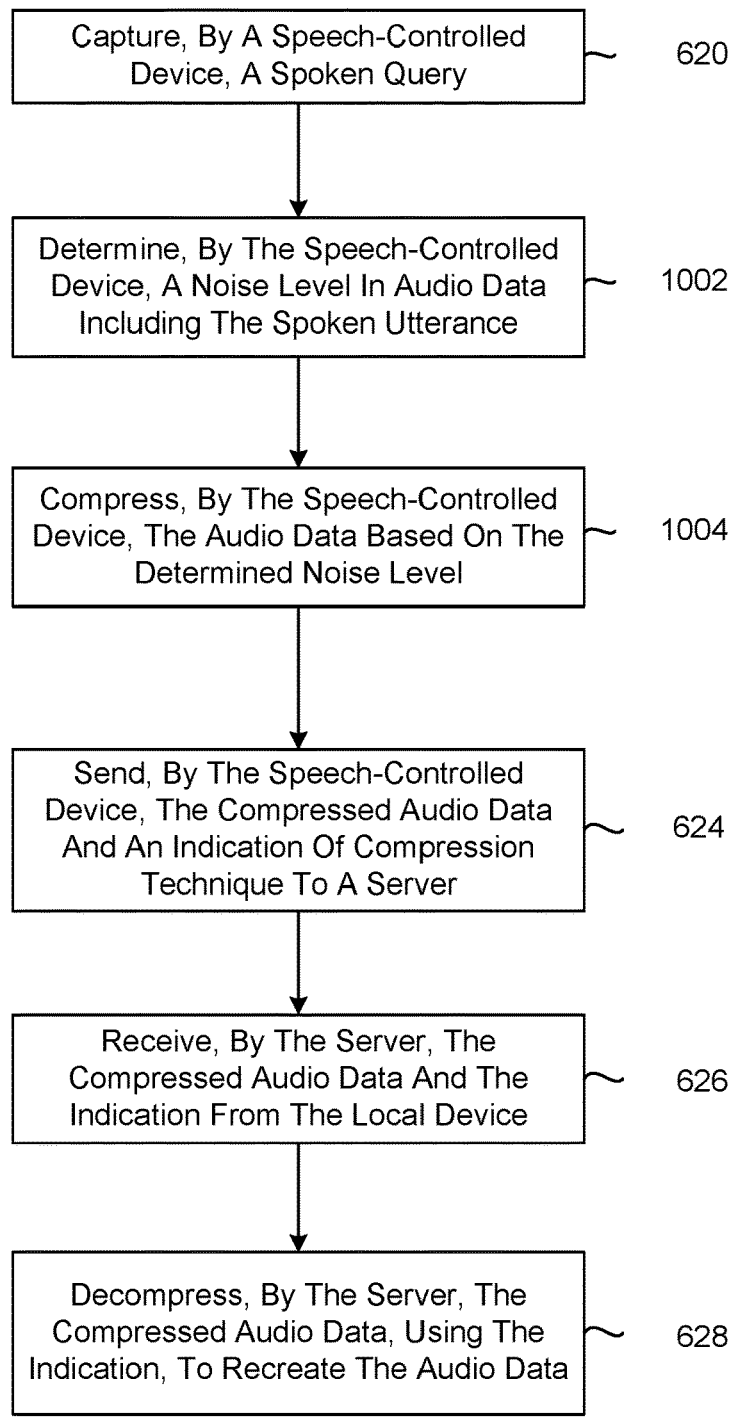
FIG. 10 is a flow diagram illustrating a method for compressing and decompressing audio data according to embodiments of the present disclosure.

Another way to compress audio data is to remove portions of the audio data based on a noise level in the audio data, as illustrated in FIG. 10. The speech-controlled device 110 may capture (620) spoken audio corresponding to a spoken query. The speech-controlled device 110 may convert the spoken audio into audio data (not illustrated). The speech-controlled device 110 may then determine (1002) a level of background noise (i.e., a magnitude of audio in the audio data that does not correspond to speech of the user) in the audio data. The speech-controlled device 110 may compress (i.e., remove portions from the audio data to create a smaller audio data file) (1004) the audio data based on the determined noise level in the audio data. For example, the speech-controlled device 110 may compress the audio data a first way if the noise level is above a first threshold but below a second threshold, may compress the audio data a second way if the noise level is above the second threshold but below a third threshold, etc. The speech-controlled device 110 may then send (624) the compressed audio data and an indicator of compression/decompression technique(s) to the server 120. The server 120 receives (626) the compressed audio data and the indicator of compression/decompression technique(s) from the speech-controlled device 110, and compresses (628) the compressed audio data, using the indicator of compression/decompression technique(s), to recreate the audio data.

Figure 11A:
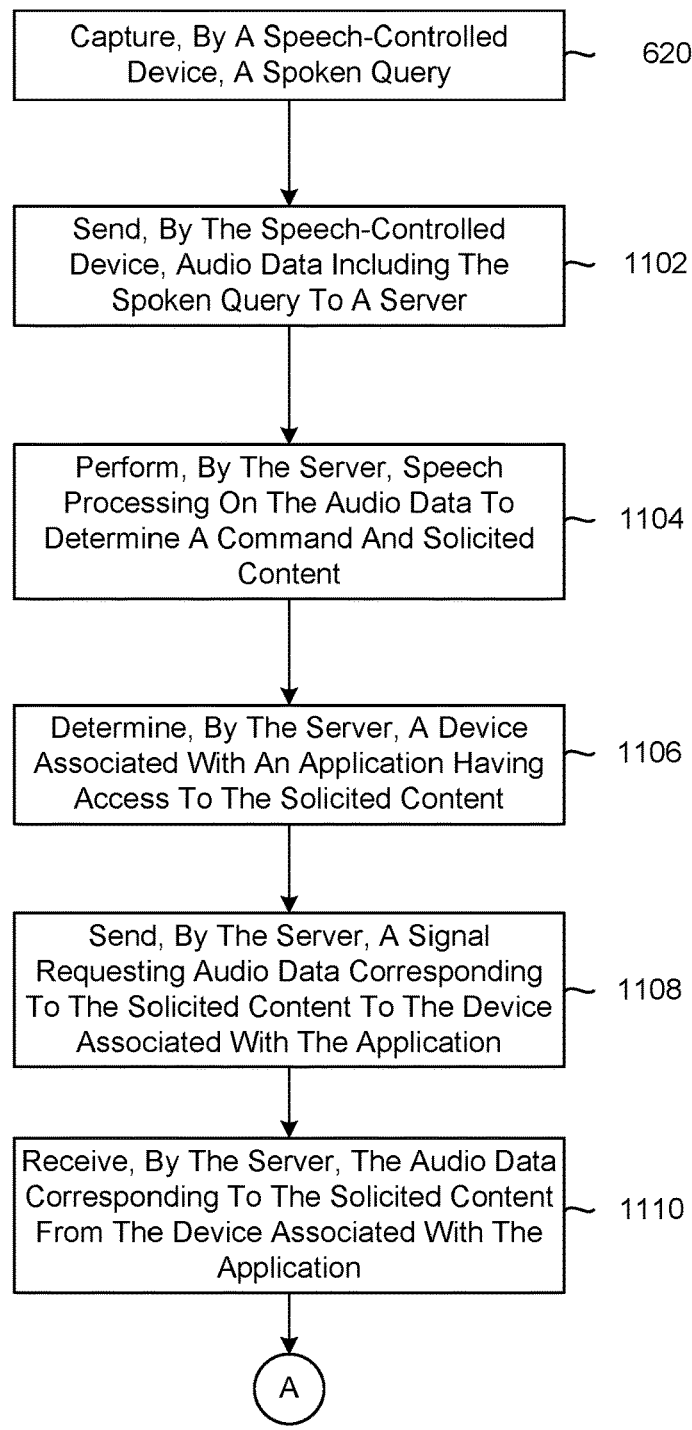
FIGS. 11A and 11B are a flow diagram illustrating a method for compressing and decompressing audio data according to embodiments of the present disclosure.
Figure 11B:
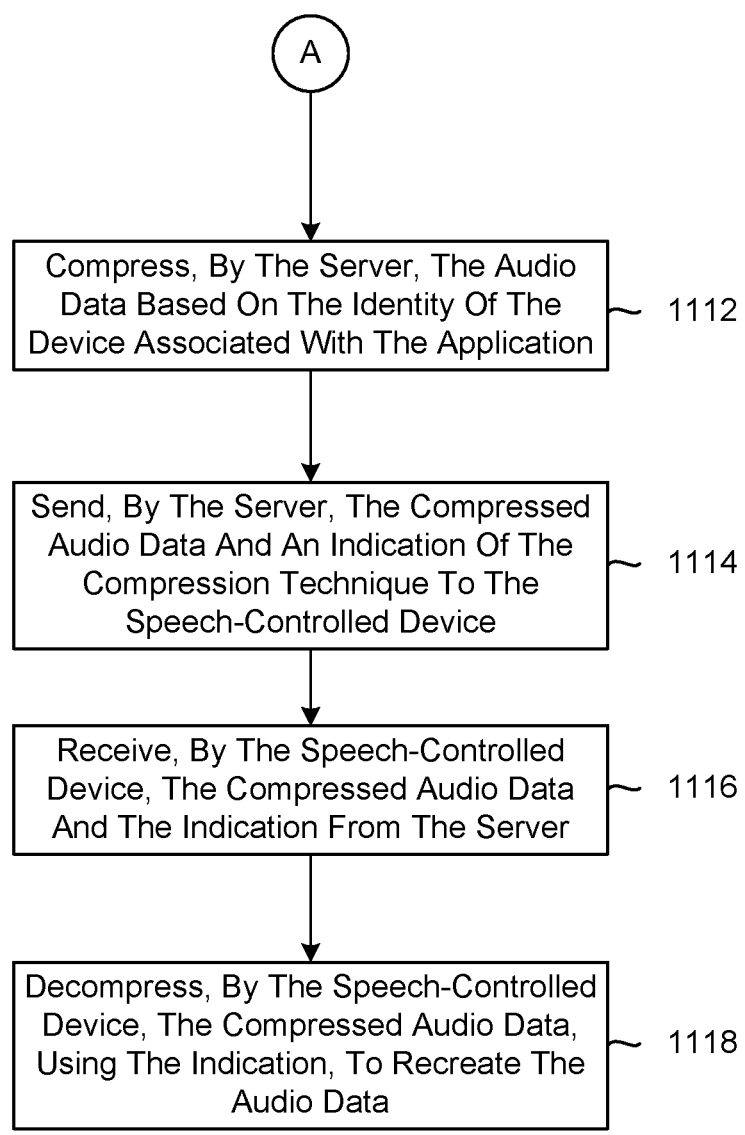

A further way to compress audio data is to remove portions of the audio data based on a source of the audio data, as illustrated in FIGS. 11A and 11B. The speech-controlled device 110 may capture (620) spoken audio corresponding to a spoken query. The speech-controlled device 110 may convert the spoken audio into audio data (not illustrated). The speech-controlled 110 may then send (1102) the audio data to the server 120.

The server 120 may perform speech processing (e.g., ASR and NLU) (1104) on the audio data to determine a command and solicited content corresponding to the spoken query. If the server 120 does not communicate directly with a storage including the solicited content, the server 120 determines (1106) a device associated with an application (e.g., the application server 125) that has access to the solicited content. For example, the determined application server 125 may include a storage including audio data corresponding to the solicited content. The server 120 may then send (1108) a signal requesting audio data corresponding to the determined application server 125. Thereafter, the server 120 receives (1110) the audio data from the application server 125. The server 120 may compress (1112 illustrated in FIG. 11B) the audio data based on the audio data being received from the application server 125. The server 120 may send (1114) the compressed audio data and an indicator of compression/decompression technique(s) to the speech-controlled device 110 from which the original spoken query originated. Alternatively, the server 120 may send the compressed audio data to a different device indicated in a user profile that also indicates the speech-controlled device 110.

The speech-controlled device 110 receives (1116) the compressed audio data and the indicator of compression/decompression technique(s) from the server 120, and compresses (1118) the compressed audio data, using the indicator of compression/decompression technique(s) to recreate the audio data received by the server 120 from the application server 125. In an example, the indicator of compression/decompression technique(s) may be an index into a lookup table. The lookup table may store audio data associated with application servers 125. The stored audio data may correspond to portions of audio data removed during the compressing process. One or more application servers 125 may be indicated in the lookup table. The speech-controlled device 110 may receive the lookup table and its contents from the server 120. For example, the speech-controlled device 110 may receive updates to the lookup table and its contents from the server 120 on a routine basis, such as daily, weekly, etc.

Figure 12A:
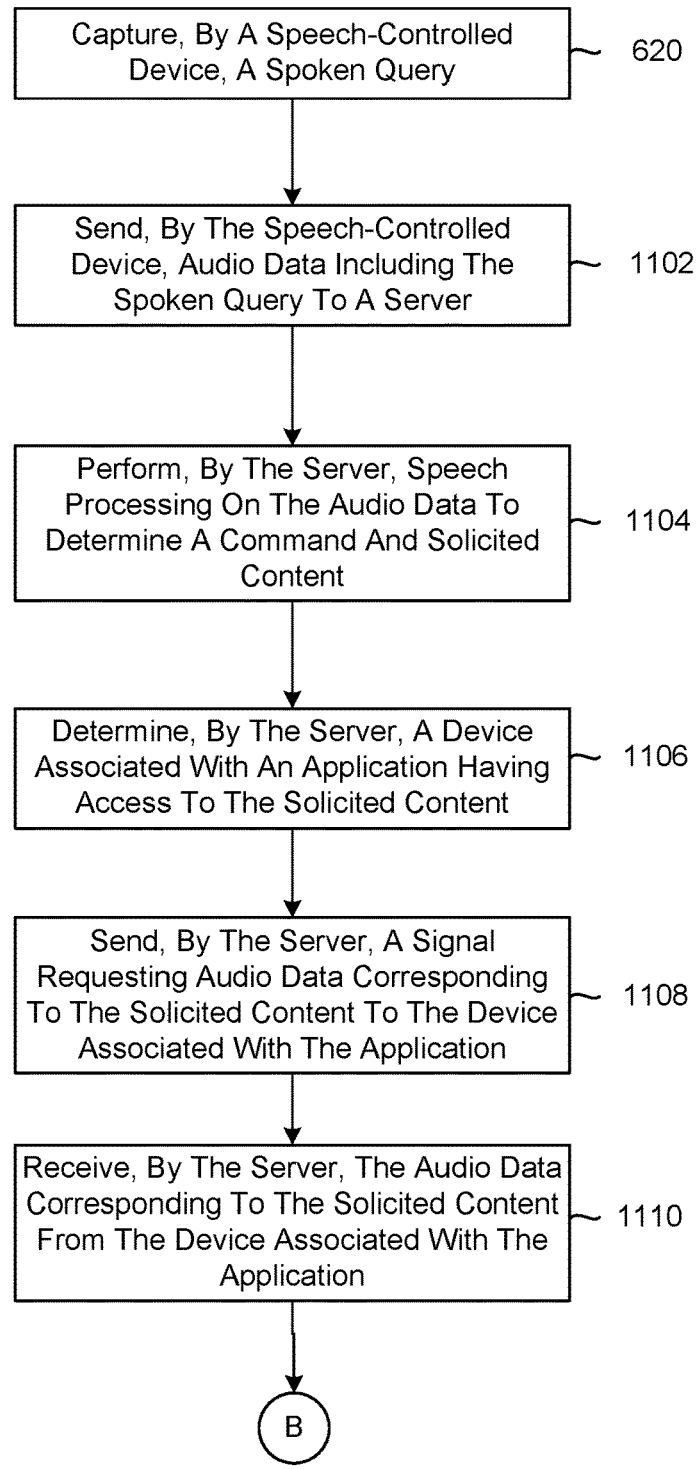
FIGS. 12A and 12B are a flow diagram illustrating a method for compressing and decompressing audio data according to embodiments of the present disclosure.
Figure 12B:
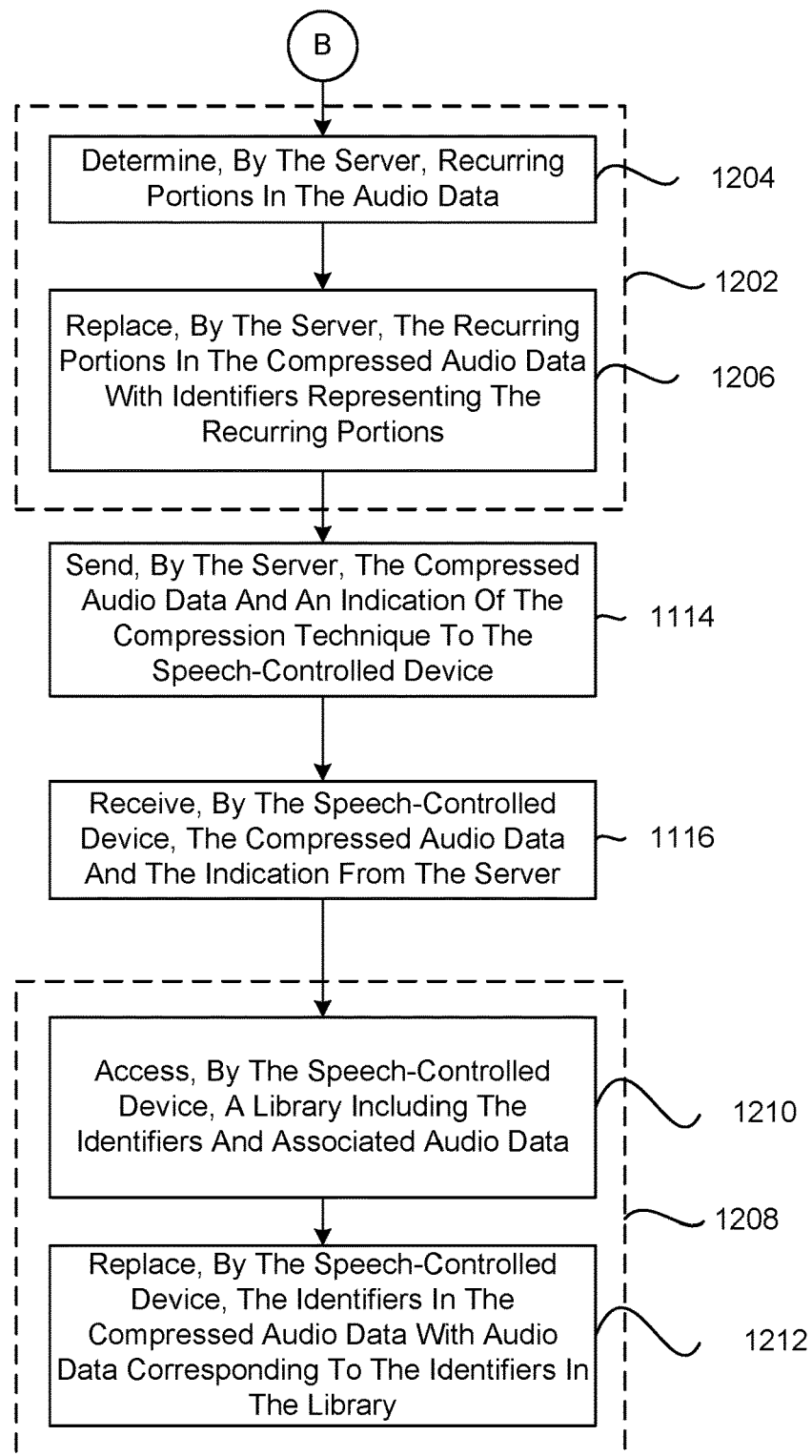

Yet another way to compress audio data is to remove recurring portions in the audio data, as illustrated in FIGS. 12A and 12B. For example, if the audio data is sound for a video game, sounds identically represented multiple times within the audio data may be replaced with an indicator of the recurring sounds.

The speech-controlled device 110 may capture (520) spoken audio corresponding to a spoken query. The speech-controlled device 110 may convert the spoken audio into audio data (not illustrated). The speech-controlled 110 may then send (1102) the audio data to the server 120.

The server 120 may perform speech processing (e.g., ASR and NLU) (1104) on the audio data to determine a command and solicited content corresponding to the spoken query. If the server 120 does not communicate directly with a storage including the solicited content, the server 120 determines (1106) a device associated with an application (e.g., the application server 125) that has access to the solicited content. For example, the determined application server 125 may include a storage including audio data corresponding to the solicited content. The server 120 may then send (1108) a signal requesting audio data corresponding to the determined application server 125. Thereafter, the server 120 receives (1110) the audio data from the application server 125. The server 120 may compress (1202 illustrated in FIG. 12B) the audio data. The server 120 may compress the audio data by determining (1204 illustrated in FIG. 12B) recurring portions in the audio data. For example, the server 120 may determine recurring portions by determining segments of common waveforms and/or feature vectors in the audio data. Compression of the audio data may additionally include the server 120 replacing (1206) the recurring portions in the audio data with identifiers representing the recurring portions. If more than one type of recurring portion is identified in the audio data, each type of recurring portion may be represented by a different identifier in the audio data. The server 120 may then send (1114) the compressed audio data and an indicator of compression/decompression technique(s) to the speech-controlled device 110 from which the original spoken query originated. Alternatively, the server 120 may send the compressed audio data to a different device indicated in a user profile that also indicates the speech-controlled device 110.

The speech-controlled device 110 receives (1116) the compressed audio data and the indicator of compression/decompression technique(s) from the server 120. The speech-controlled device 110 then compresses (1208) the audio data. The speech-controlled device 110 may decompress the compressed audio data by using contents of the indicator of compression/decompression technique(s) as an index to access (1210) a library of identifiers with associated audio data. Decompressing of the compressed audio data may additionally include the speech-controlled device 110 determining identifiers in the library corresponding to identifiers indicated in the indicator of compression/decompression technique(s), determining audio data in the library corresponding to the determined identifiers, and replacing (1212) the identifiers in the compressed audio data with the determined audio data in the library. One or more identifiers may be indicated in the library. The speech-controlled device 110 may receive content for the library from the server 120. For example, the speech-controlled device 110 may receive the content from the server 120 on a routine basis, such as daily, weekly, etc.

Figure 13A:
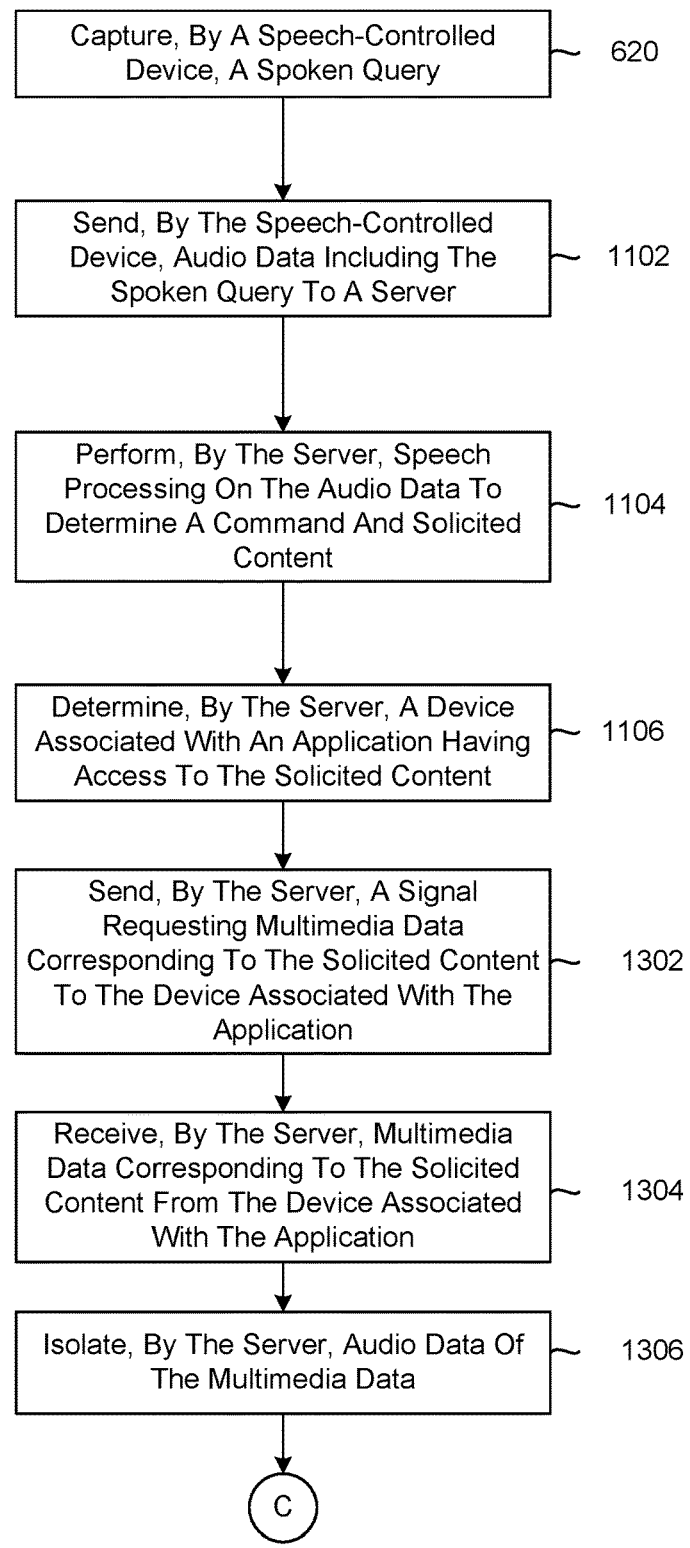
FIGS. 13A and 13B are a flow diagram illustrating a method for compressing and decompressing audio data according to embodiments of the present disclosure.
Figure 13B:
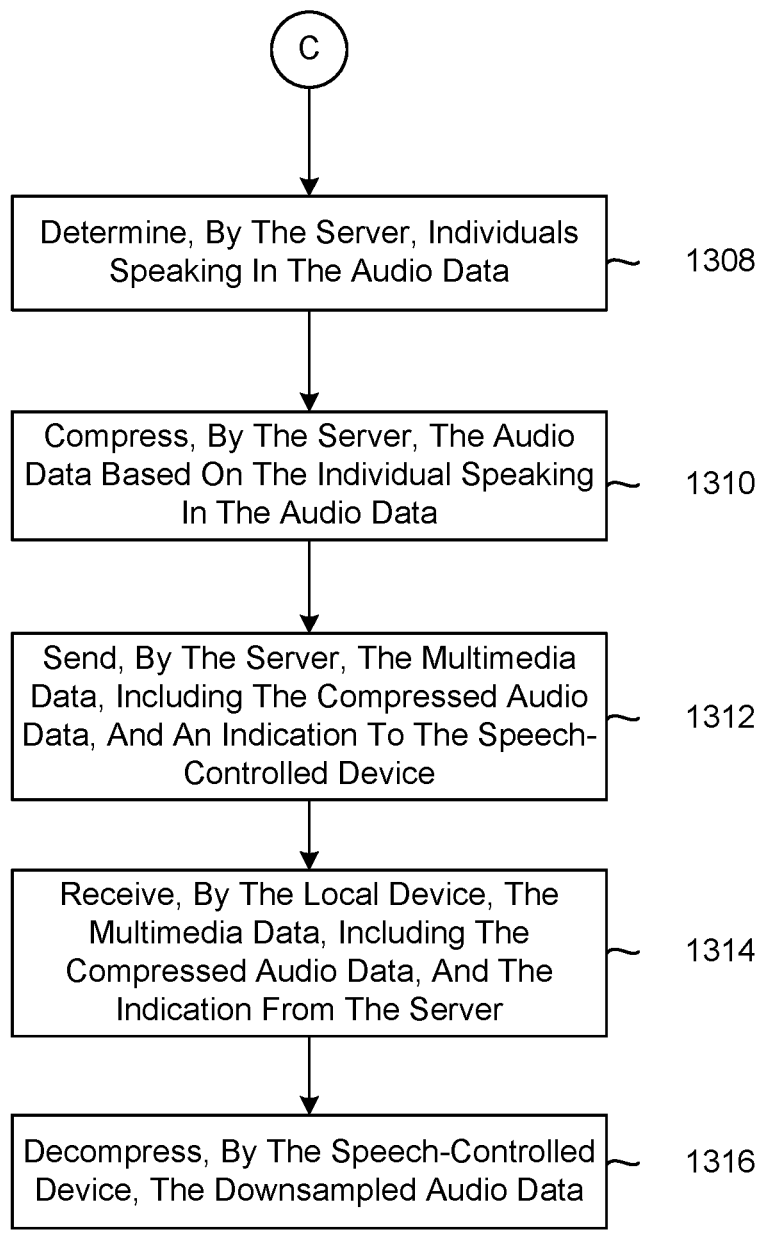

An additional way to compress audio data is to remove portions of the audio data based on the individuals represented in the audio data, as illustrated in FIGS. 13A and 13B. For example, the spoken query may request multimedia content such as a movie, wherein multiple individuals speak. The system may determine when certain individuals (such as particular actors) are speaking and may compress/decompress those portions of audio data based at least in part on the actor, the character being portrayed, or other factors).

The speech-controlled device 110 may capture (620) spoken audio corresponding to a spoken query. The speech-controlled device 110 may convert the spoken audio into audio data (not illustrated). The speech-controlled 110 may then send (1102) the audio data to the server 120.

The server 120 may perform speech processing (e.g., ASR and NLU) (1104) on the audio data to determine a command and solicited content corresponding to the spoken query. If the server 120 does not communicate directly with a storage including the solicited content, the server 120 determines (1106) a device associated with an application (e.g., the application server 125) that has access to the solicited content. For example, the determined application server 125 may include a storage including multimedia data corresponding to the solicited content. The server 120 may then send (1302) a signal requesting multimedia data to the determined application server 125. Thereafter, the server 120 receives (1304) the multimedia data from the application server 125. The server 120 may then isolate (1306) audio data of the multimedia data, and determine (1308) individuals speaking in the audio data. The identity of each individual may be determined using a speaker ID. For example, each individual may speak with different characteristics. As such, the server 120 can analyze the audio data corresponding to determine unique characteristics located therein, and then tag portions of the audio data having common characteristics as being spoken by a single individual. Alternatively, the server 120 may additionally receive an index from the application server 125. The index may include data identifying the individual speaking in the audio data, as well as respective portions of the audio data where each individual speaks. The server 120 may then compress (1310) the audio data based on the individuals determined to be speaking in the audio data. For example, portions of the audio data spoken by a first individual may be compressed using a first technique, portions of the audio data spoken by a second individual may be compressed using a second technique, etc. The server 120 may then send (1312) the multimedia data, including the compressed audio data, and an indicator of compression/decompression technique(s) to the speech-controlled device 110 from which the original spoken query originated. Alternatively, the server 120 may send the multimedia data, including the compressed audio data, and the indicator of compression/decompression technique(s) to a different device indicated in a user profile that also indicates the speech-controlled device 110.

The speech-controlled device 110 receives (1314) the multimedia data, including the compressed audio data, and the indicator of compression/decompression technique(s) from the server 120. The speech-controlled device 110 then decompresses (1316) the compressed audio data using the indicator of compression/decompression technique(s). For example, the speech-controlled device 110 may use contents of the indicator of compression/decompression technique(s) as an index into a lookup table or library of individual identifying information (e.g., name) with associated audio data. The speech-controlled device 110 may determine individual identifying information in the library corresponding to individual identifying information in the indicator of compression/decompression technique(s), determine audio data in the library corresponding to the determined individual identifying information, and decompress the compressed audio data using the determined audio data. One or more individuals may be indicated in the library. The speech-controlled device 110 may receive content for the library from the server 120. For example, the speech-controlled device 110 may receive the content from the server 120 on a routine basis, such as daily, weekly, etc.

The speech-controlled device 110 may determine how to compress audio data based on speech characteristics of a user. The speech-controlled device 110 may do this prior to capturing audio spoken by the user. The speech-controlled device 110 may determine example audio data corresponding to speech examples of the user. The audio data corresponding to the speech examples may be stored in the user's user profile. The speech-controlled device 110 may process the example audio data to determine speech characteristics of the user. For example, the speech characteristics may include one or more accents of the user, a native language of the user, a speech rate of the user (e.g., measures in phonemes per unit of time, words per unit of time, etc.), a pause rate of the user, a pitch of the user, etc. Using the speech characteristics of the user, the speech-controlled device 110 may determine an appropriate compression technique. The speech-controlled device 110 may also create a compression technique indicator for the determined compression technique, and may store such indicator in the user's profile.

While the figures have been described in detail separately hereinabove, it should be appreciated that components of the various figures may be combined in various forms to create methods, systems, and devices according to the present disclosure.

Figure 14:
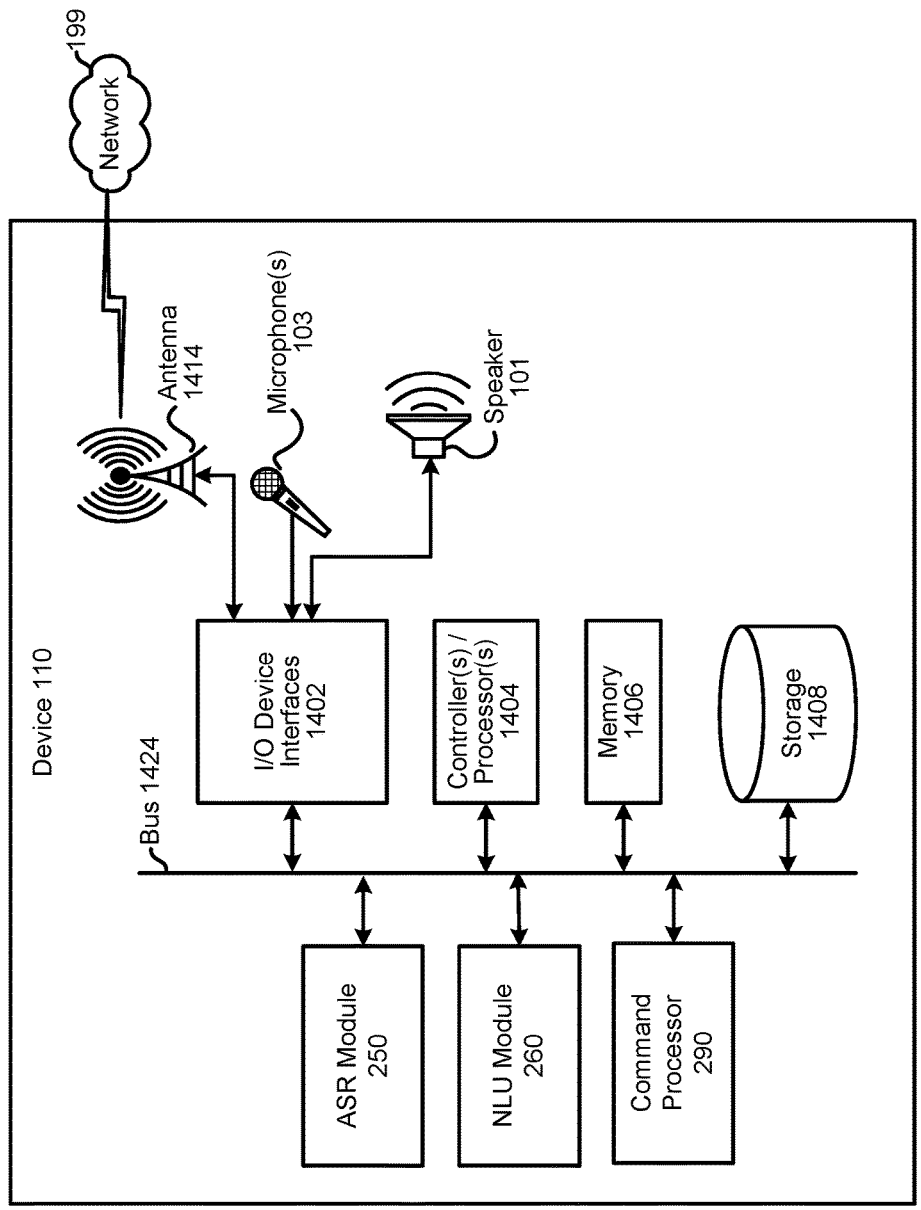
FIG. 14 is a block diagram conceptually illustrating example components of a device according to embodiments of the present disclosure.
Figure 15:
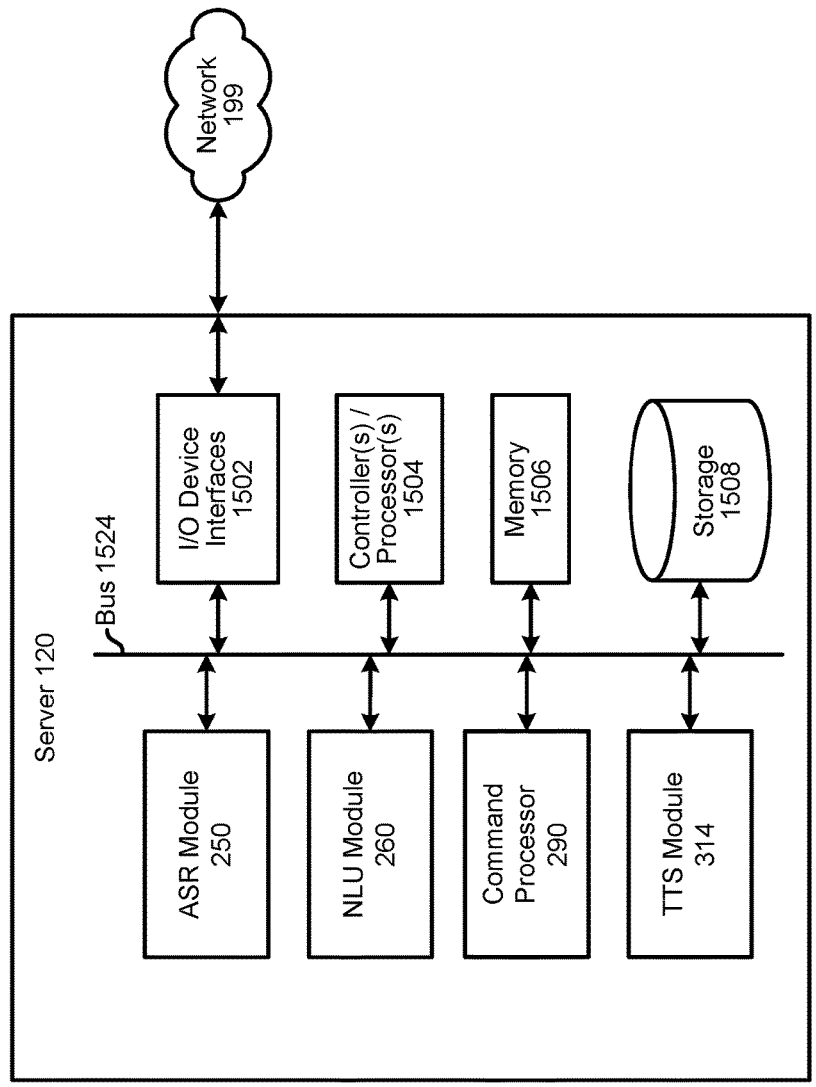
FIG. 15 is a block diagram conceptually illustrating example components of a server according to embodiments of the present disclosure.

FIG. 14 is a block diagram conceptually illustrating a user device 110 (e.g., the speech-controlled device 110 described herein) that may be used with the described system. FIG. 15 is a block diagram conceptually illustrating example components of a remote device, such as the server 120 that may assist with ASR processing, NLU processing, or command processing. Multiple servers 120 may be included in the system, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1404/1504), that may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive (MRAM) and/or other types of memory. Each device (110/120) may also include a data storage component (1408/1508), for storing data and controller/processor-executable instructions. Each data storage component may individually include one or more non-volatile storage types such as magnetic storage, optical storage, solid-state storage, etc.

Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to the device 110 of FIG. 14, the device 110 may include input/output device interfaces 1302 that connect to a variety of components such as an audio output component such as a speaker 101, a wired headset or a wireless headset (not illustrated), or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array.

For example, via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or the server 120 may include an ASR module 250. The ASR module 250 in device 110 may be of limited or extended capabilities. The ASR module 250 may include the language models 254 stored in ASR model storage component 252. If limited speech recognition is included, the ASR module 250 may be configured to identify a limited number of words, whereas extended speech recognition may be configured to recognize a much larger range of words.

The device 110 and/or the server 120 may include a limited or extended NLU module 260. The NLU module 260 in device 110 may be of limited or extended capabilities. The NLU module 260 may comprise the name entity recognition module 262, the intent classification module 264, and/or other components. The NLU module 260 may also include a stored knowledge base and/or entity library, or those storages may be separately located.

The device 110 and/or the server 120 may also include the command processor 290 configured to execute commands/functions associated with a spoken query as described above.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 14 and 15, are exemplary, and may be located as a stand-alone device or may be included, in whole or in part, as a component of a larger device or system.

To create output speech, the server 120 may be configured with the TTS module 314 described in detail herein above.

As illustrated in FIG. 16 multiple devices (120, 110, 110a-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110, a tablet computer 110d, a smart phone 110b, a smart watch 110c, and/or a vehicle 110e may be connected to the network 199 through a wireless service provider, over a WiFi or cellular network connection, or the like. Other devices are included as network-connected support devices, such as the server 120, application developer devices (e.g., the application server 125), or others. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR module 250, the NLU module 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
by a speech-controlled device:
 determining input audio data corresponding to an utterance,
 determining an identity of a user speaking the utterance,
 selecting a first audio compression technique based at least in part on the identity,
 creating first compressed audio data using the first audio compression technique by removing data portions from the input audio data, the data portions being represented in the input audio data at regular intervals,
 sending the first compressed audio data to a remote device, and
 sending a first indicator of the first audio compression technique to the remote device;
by the remote device:
 receiving, from the speech-controlled device, the first compressed audio data,
 receiving the first indicator from the speech-controlled device,
 selecting a first decompression technique using the first indicator, the first decompression technique corresponding to the first compression technique,
 creating first decompressed audio data using the first audio decompression technique by inserting data portions into the first compressed audio data,
 performing automatic speech recognition processing on the first decompressed audio to create text data,
 performing natural language understanding processing on the text data to determine a command portion and a content portion,
 determining content audio data corresponding to the content portion,
 selecting a second audio compression technique based at least in part on the content audio data,
 creating compressed content audio data using the second audio compression technique by removing data portions from the content audio data, the data portions being represented in the content audio data at regular intervals,
 sending, to the speech-controlled device, the compressed content audio data, and
 sending, to the speech-controlled device, a second indicator corresponding to the second compression technique.

2. The computer-implemented method of claim 1, further comprising, prior to capturing the input audio data:
 determining example audio data corresponding to speech examples of the user;
 processing the example audio data to determine speech characteristics of the user, the speech characteristics comprising one or more of an accent of the user, a speech rate of the user, a pause rate of the user, and a pitch of the user;
 determining the first compression technique based at least in part on the speech characteristics; and
 storing, in a user profile, the first indicator corresponding to the first compression technique with a second indicator corresponding to the user.

3. A system comprising:
at least one processor; and
memory including instructions operable to be executed by the at least one processor to perform a set of actions to configure the at least one processor to:
 receive a request for delivery of content comprising at least audio data;
 determine content audio data based on the request;
 determine a natural language represented in the content audio data;
 select a first compression technique based at least in part on the determined natural language in the content audio data;
 create compressed content audio data using the first compression technique by removing portions from the content audio data;
 output, to a first device, the compressed content audio data; and
 output, to the first device, an indicator corresponding to the first compression technique.

4. The system of claim 3, wherein the portions are removed from the content audio data at regular intervals.

5. The system of claim 3, wherein the instructions further configure the at least one processor to:
 determine a quantity non-speech audio in the content audio data is above a threshold,
 wherein the first compression technique is selected based at least in part on the non-speech audio data being above the threshold.

6. The system of claim 3, wherein the instructions further configure the at least one processor to:
 determine a plurality of identical portions of audio data in the content audio data,
 wherein the first compression technique comprises removing one or more of the plurality of identical portions.

7. The system of claim 3, wherein the instructions further configure the at least one processor to:
 determine an individual speaking in the output audio data,
 wherein the first compression technique is selected based at least in part on the individual.

8. The system of claim 3, wherein the instructions further configure the at least one processor to:
 receive input audio data from a first device;
 perform automatic speech recognition (ASR) on the input audio data to determine text data; and
 perform natural language understanding (NLU) processing on the text data to determine the request for delivery of content.

9. The system of claim 8, wherein the instructions further configure the at least one processor to:
 access a user profile associated with the first device;
 determine a second device associated with the user profile; and
 output, to the second device, the compressed content audio data and the indicator.

10. The system of claim 3, wherein the instruction causes the first device to access a lookup table to identify at least one decompression technique corresponding to the first compression technique.

11. The system of claim 3, wherein the instructions further configure the at least one processor to:

determine a second portion of content audio data based on the request, wherein the second portion directly follows the content audio data in a media item;

select a second compression technique based at least in part on at least one characteristic of the second portion, wherein the second compression technique is different from the first compression technique;

create second compressed content audio data using the second compression technique and the second portion;

output, to the first device, the second compressed content audio data; and output, to the first device, a second indicator corresponding to the second compression technique.

12. A computer-implemented method comprising:

capturing audio data representing an utterance using a first device;

determining at least one characteristic corresponding to at least one of the audio data or the utterance;

determining a natural language represented in the audio data;

selecting an audio compression technique based at least in part on the determined natural language in the audio data;

creating compressed audio data using the audio compression technique by removing data portions from the request;

outputting the compressed audio data to a second device; and outputting an indicator of the audio compression technique to the second device.

13. The computer-implemented method of claim 12, wherein the portions are removed from the request at regular intervals indicated by the audio compression technique.

14. The method of claim 12, further comprising:
determining an identity of a speaker of the utterance,
wherein selecting the audio compression technique is based at least in part on the identity.

15. The method of claim 12, further comprising:
determining a location associated with the first device,
wherein selecting the audio compression technique is based at least in part on the location.

16. The method of claim 12, further comprising:
determining a quantity non-speech audio in the content audio data is above a threshold,
wherein selecting the audio compression technique is based at least in part on the non-speech audio data being above the threshold.

17. The method of claim 12, further comprising:
determining a plurality of identical portions in the audio data,
wherein the compression technique comprises removing one or more of the identical portions.

18. The method of claim 17, further comprising:
inserting, into the compressed audio data, one or more second indicators corresponding to the removed one or more identical portions.

* * * * *